United States Patent [19]

Motokado et al.

[11] Patent Number: 5,468,077
[45] Date of Patent: Nov. 21, 1995

[54] METHOD AND APPARATUS FOR COMBINING CHARACTERS

[75] Inventors: Tomoko Motokado; Shinichiro Motokado, both of Kawasaki; Mutsumi Ohtomo, Higashi, all of Japan

[73] Assignee: Fujitsu Limited, Kanagawa, Japan

[21] Appl. No.: 263,741

[22] Filed: Jun. 22, 1994

[30] Foreign Application Priority Data

Jul. 16, 1993 [JP] Japan .................... 5-199301

[51] Int. Cl.[6] .................................. B41J 11/44
[52] U.S. Cl. .................... 400/76; 400/110; 345/128; 395/102; 395/110; 395/151
[58] Field of Search .................. 400/121, 61, 76, 400/70, 109, 110; 395/102, 110, 139, 150, 151; 345/128, 129, 130, 143, 144

[56] References Cited

U.S. PATENT DOCUMENTS

| | | | |
|---|---|---|---|
| 4,621,340 | 11/1986 | Pokorny et al. | 345/128 |
| 4,670,841 | 6/1987 | Kostopoulos | 345/128 |
| 4,879,653 | 11/1989 | Shinoto | 400/109 |
| 4,920,492 | 4/1990 | Wong | 400/110 |
| 5,212,769 | 5/1993 | Pong | 395/151 |
| 5,251,293 | 10/1993 | Ishii | 395/151 |
| 5,285,505 | 2/1994 | Kim | 395/151 |

*Primary Examiner*—Edgar S. Burr
*Assistant Examiner*—Steven S. Kelley

[57] ABSTRACT

A method and apparatus for combining a character pattern of a first typeface with a character pattern of a second typeface to generate a character pattern of a third typeface, wherein searching for corresponding part patterns or contour points among part patterns constituting a character pattern of the first typeface and part patterns or contour points among part patterns constituting a character pattern of the second typeface is performed, based on identical code data affixed to the corresponding part patterns or contour points. The corresponding part patterns or contour points are combined to prepare part patterns or contour points of a character pattern of the third typeface. The apparatus has a typeface data memory having a first typeface file for storing individual part patterns of each character pattern of the first typeface with code data being affixed to the part patterns, and a second typeface memory for storing individual part patterns of each character pattern of the second typeface with the same code data affixed to the part patterns of the first typeface being affixed to corresponding part patterns of the each character pattern of the second typeface which correspond to the part patterns of the first typeface. A character processing circuit is provided for combining corresponding part patterns, affixed with the same code data to prepare part patterns of a character pattern of the third typeface.

28 Claims, 26 Drawing Sheets

7a FONT FILE (Mincho)

7b FONT FILE (Gothic)

NEW TYPEFACE

FIG. 8A  FIG. 8B  FIG. 8C
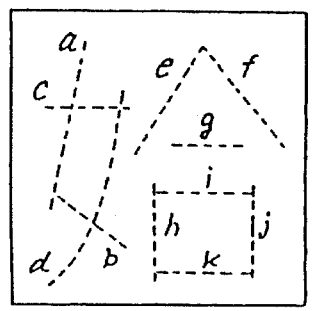
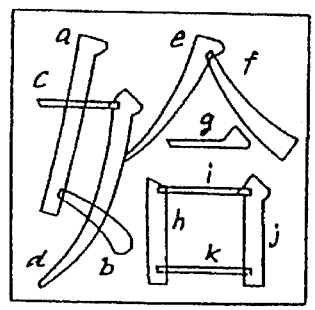
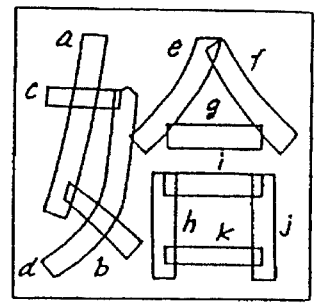
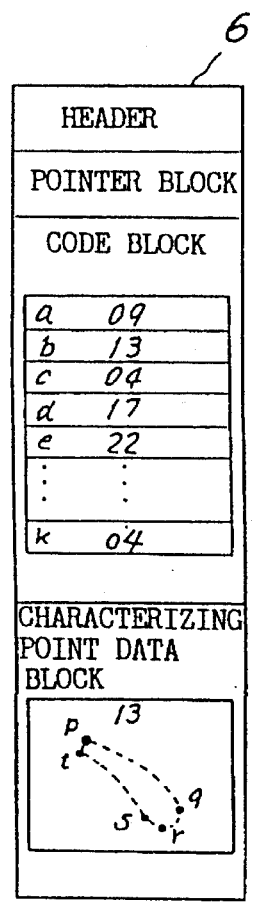
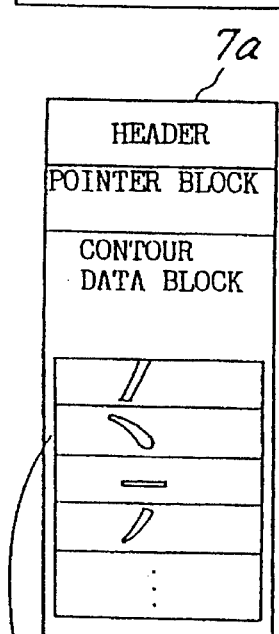
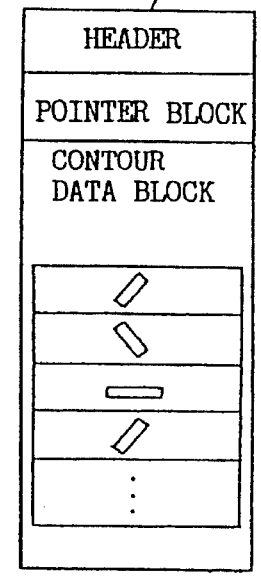
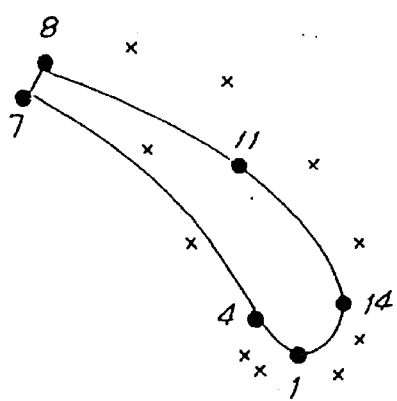
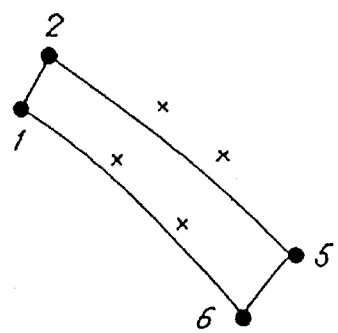

FIG. 9
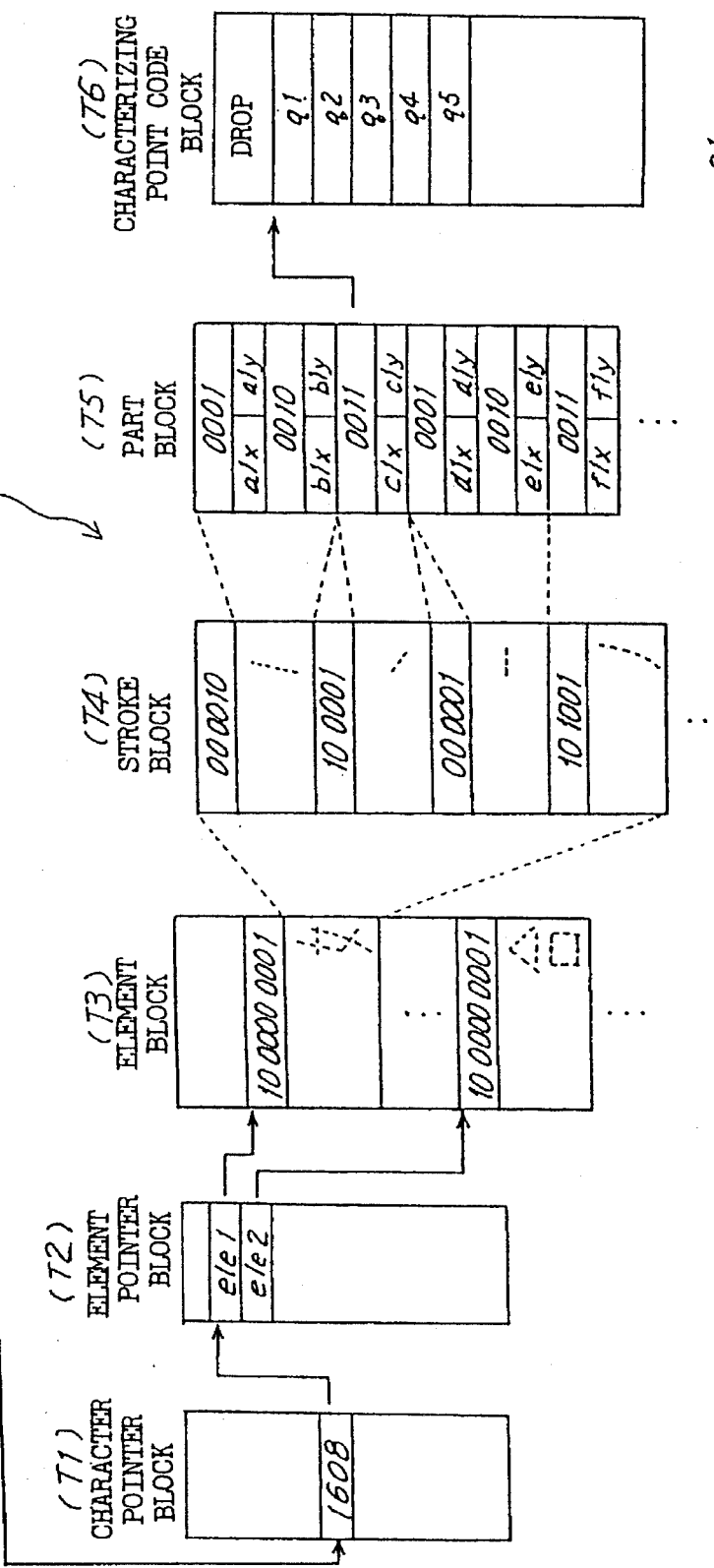
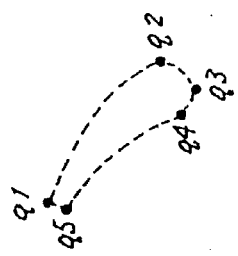

FIG. 23A PRIOR ART
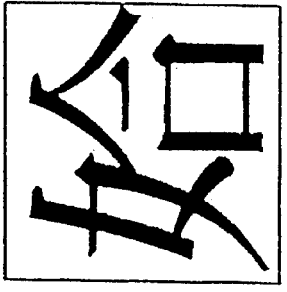  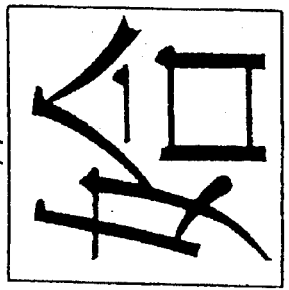
LIGHT MINCHO A + BOLD MINCHO B ⇒ INTERMEDIATE MINCHO
INTERPOLATION
FIG. 23B PRIOR ART
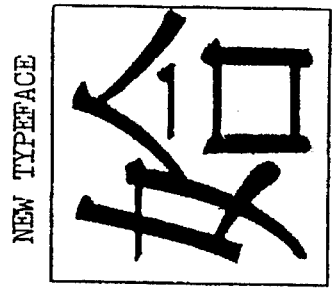 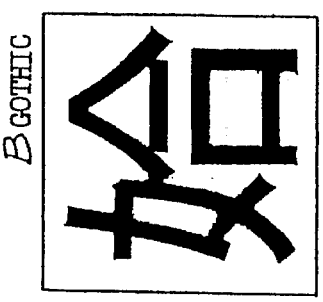 
THIN MINCHO A + B GOTHIC ⇒ NEW TYPEFACE
COMBINATION

FIG. 25
PRIOR ART
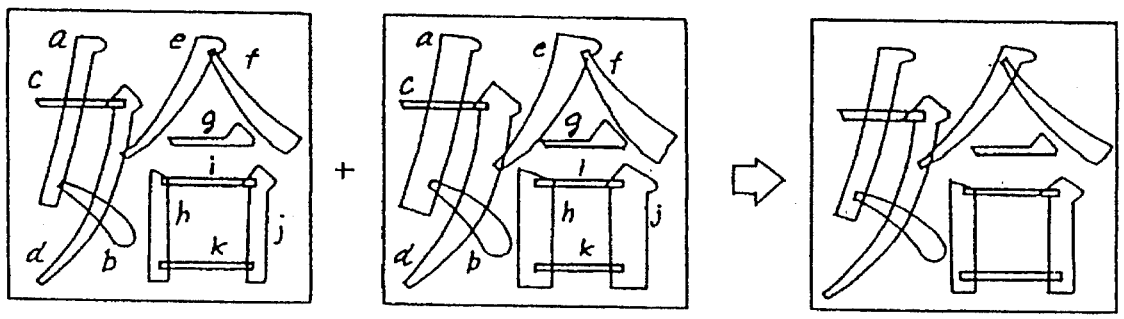
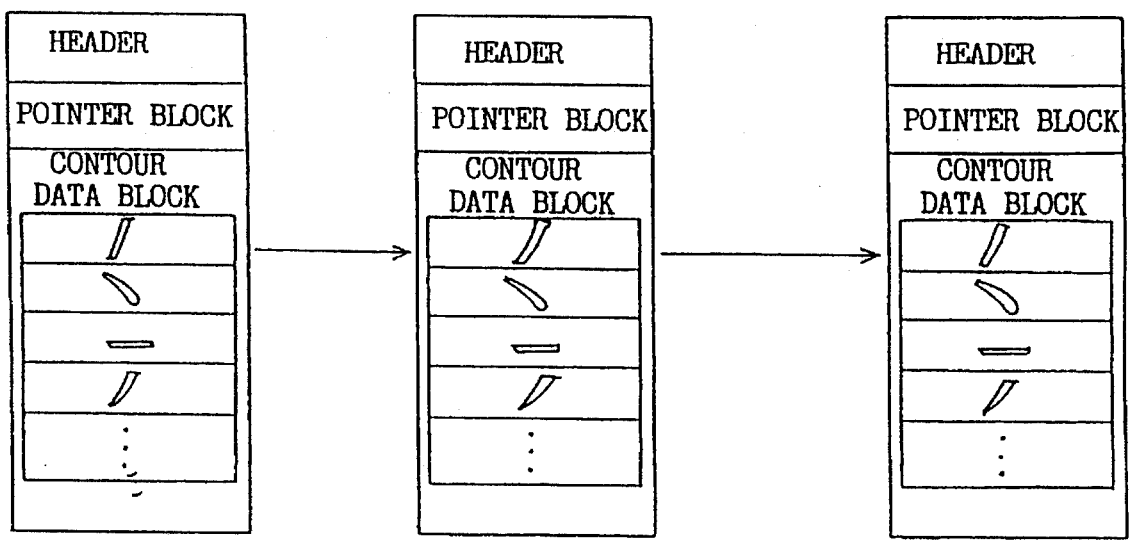
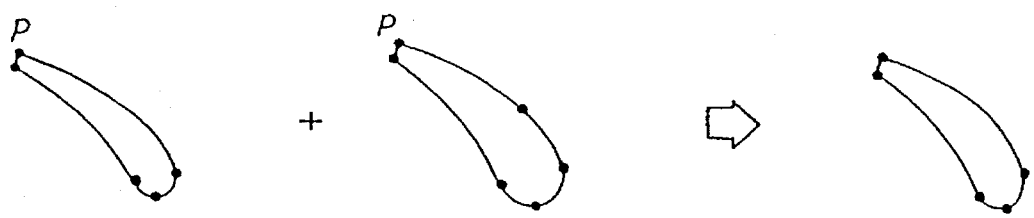

FIG. 26
PRIOR ART
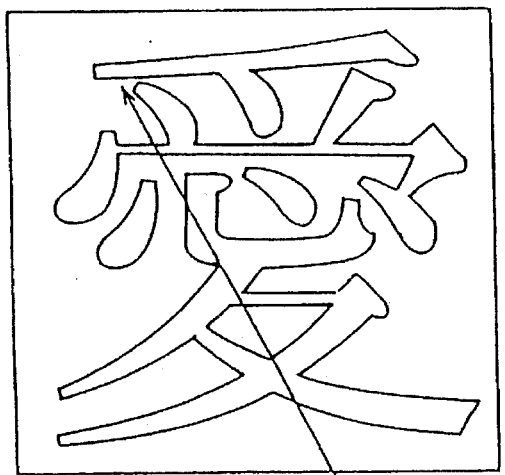
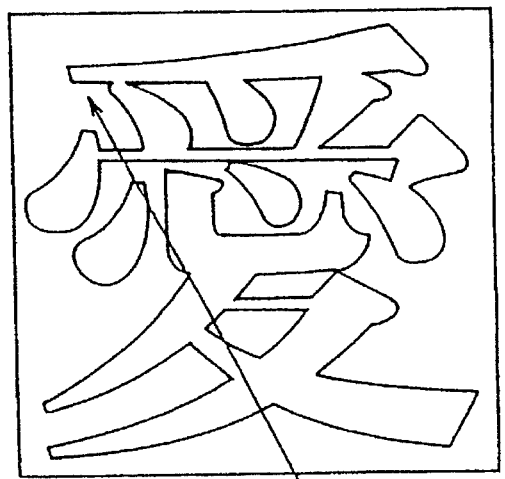
A
B
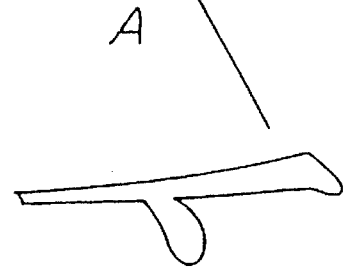
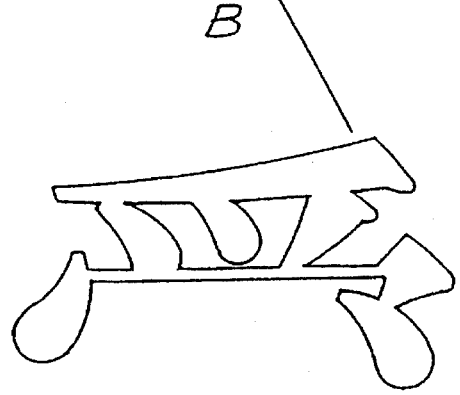

5,468,077

METHOD AND APPARATUS FOR COMBINING CHARACTERS

BACKGROUND OF THE INVENTION

1. Field of the Invention

The present invention relates to a method and apparatus for combining a plurality of character patterns to produce a character pattern of a new typeface.

2. Description of the Related Art

Character patterns are widely used in apparatuses which display and/or print characters. Those apparatuses have character patterns stored therein, generate character patterns corresponding to character codes and display or print the patterns. The character patterns are typically bit-mapped when stored. For Kanji characters or the like which include many characters, the bit-mapping of the individual character patterns increases the memory capacity, so that a method of storing characters in an outline (contour line) format becomes popular.

This outline system is advantageous over the bit-mapping system in data compression.

There is a demand for an increased number of typefaces for Kanji characters or the like. It takes time and efforts to design new typefaces for a vast amount of characters like Kanji characters to meet the demand. It is therefore desirable to create new typefaces without actual designing.

FIGS. 23A and 23B are explanatory diagrams of interpolation and combining, and FIG. 24 is an explanatory diagram of an operation to interpolate characters. To efficiently develop character typefaces, there is a scheme to combine typefaces ("blend" is used in a broad sense). This combination includes "interpolation" and "combination" (in a narrow sense). FIG. 23A exemplifies the interpolation of a typeface to produce an intermediate Mincho character having an intermediate weight from a light Mincho character A and a bold Mincho character B. FIG. 23B shows an example of combining (in a narrow sense) typefaces to produce a new typeface, which is in-between Mincho and Gothic characters, from a Mincho character A and a Gothic character B.

As shown in FIG. 24, the light Mincho character A and bold Mincho character B both have, for example, five contour lines (patterns) 1 to 5 for typeface interpolation. The corresponding contour lines for both Mincho characters are detected, and corresponding contour points on the corresponding contour lines are found. Then, middle values of the corresponding contour points are generated as new contour points. For the combination of typefaces, likewise, corresponding contour lines for the Mincho and Gothic characters are detected, and corresponding contour points on the corresponding contour lines are found. Then, middle values of the corresponding contour points are generated as new contour points.

FIG. 25 is an explanatory diagram of prior art. One known way of finding such corresponding contour lines is to arrange individual contour lines in the same order between different typefaces and to arrange contour points on each contour line in the same order between different typefaces as shown in FIG. 25 (see Japanese Unexamined Patent Publication No. 272460/1989, for example). Another method is to arrange contour lines in a different order and recognize the patterns of the contour lines to search for corresponding contour lines.

The prior art, however, has some shortcomings. First, prearranging contour line data in the same order between typefaces is restrictive in font development and increases the number of steps in the font development. Secondly, the arrangement of contour points requires that individual typefaces should have the same number of contour lines laid out at the same positions previously. This increases the number of steps in the font development and the amount of font data.

The scheme that uses pattern recognition to associate contour lines and contour points for one typeface with those of another typeface involves a complicated pattern recognition algorithm which takes time in processing data. If a pattern to be recognized is complex, erroneous recognition may occur, resulting in frequency failure of interpolation and combination. Further, some characters have different numbers of contour lines for light and bold Mincho characters. For instance, a Kanji character "Ai" shown in FIG. 26 has different numbers of contour lines for its light Mincho character A and its bold Mincho character B. Furthermore, the first contour line of the Mincho character A has a different shape and size from those of the Mincho character B. As there are many such characters that are designed as to have separate contour lines for their light Mincho characters A but have overlapping contour lines for their bold Mincho characters B, those characters cannot automatically be generated by associating their contour lines of one typeface with those of another typeface or by pattern recognition.

SUMMARY OF THE INVENTION

It is therefore an object of the present invention to provide a character combining method and apparatus for combining character patterns by easily associating part patterns of one typeface with those of another typeface.

It is another object of the present invention to provide a character combining method and apparatus for combining character patterns by easily associating contour points of one typeface with those of another typeface.

To achieve the above object, according to one aspect of this invention, there is provided a character combining method for combining a character pattern of a first typeface with a character pattern of a second typeface to generate a character pattern of a third typeface, which method comprises the steps of searching for corresponding part patterns among part patterns constituting a character pattern of said first typeface and part patterns constituting a character pattern of said second typeface based on code data affixed to said corresponding part patterns; and combining said corresponding part patterns to prepare part patterns of a character pattern of said third typeface.

According to another aspect of this invention, there is provided a character combining apparatus for combining a character pattern of a first typeface with a character pattern of a second typeface to generate a character pattern of a third typeface, which apparatus comprises typeface data memory having a first typeface file for storing individual part patterns of each character pattern of said first typeface with code data being affixed to said part patterns, and a second typeface file for storing individual part patterns of each character pattern of said second typeface with the same code data affixed to said part patterns of said first typeface being affixed to corresponding part patterns of said each character pattern of said second typeface which correspond to said part patterns of said first typeface; and a character processing circuit for reading part patterns of a character pattern from said first typeface memory and part patterns of a character pattern from said second typeface memory and combining corresponding part patterns affixed with said same code data to prepare part patterns of a character pattern of said third typeface.

According to the above method and apparatus, specific code data common to individual typefaces and indicating each part pattern is affixed to each of corresponding part patterns of characters of the individual typefaces and part patterns of different typefaces are associated with each other based on the code data to combine characters, so that part patterns need not be arranged typeface by typeface. It is also unnecessary to perform pattern recognition to establish the association of part patterns with one another. Further, code data can be affixed to only corresponding part patterns, so that part patterns having no corresponding relationship can be eliminated in the combining process.

According to a different aspect of this invention, there is provided a character combining method for combining a character pattern of a first typeface with a character pattern of a second typeface to generate a character pattern of a third typeface, which method comprises the steps of searching for corresponding contour points among contour points of part patterns constituting a character pattern of said first typeface and contour points of part patterns constituting a character pattern of said second typeface based on contour point code data affixed to said corresponding contour points; and combining said corresponding contour points to prepare contour points of a character pattern of said third typeface.

According to a further aspect of this invention, there is provided a character combining apparatus for combining a character pattern of a first typeface with a character pattern of a second typeface to generate a character pattern of a third typeface, which apparatus comprises typeface data memory having a first typeface file for storing coordinates of individual contour points of each of part patterns of each character pattern of said first typeface with contour point codes being affixed to said contour points, and a second typeface file for storing coordinates of individual contour points of each of part patterns of each character pattern of said second typeface with the same codes affixed to said contour points of corresponding part patterns of said first typeface being affixed to said contour points of corresponding part patterns of said each character pattern of said second typeface which correspond to said part patterns of said first typeface; and a character processing circuit for reading contour points of each of part patterns of a character pattern from said first typeface memory and contour points of each of part patterns of a character pattern from said second typeface memory and combining contour points affixed with said same contour point codes to prepare contour points of each of part patterns of a character pattern of said third typeface.

According to the second method and apparatus, contour point codes common to individual typefaces are affixed to contour points of each of corresponding part patterns of characters of the individual typefaces and contour points of different typefaces are associated with one another based on the contour point codes to combine characters, so that contour points need not be arranged typeface by typeface. It is also unnecessary to perform pattern recognition to establish the association of part patterns with one another. Further, contour point codes can be affixed to only corresponding contour points, so that contour points having no corresponding relationship can be eliminated in the combining process.

Other features and advantages of the present invention will be readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

FIG. 8 is a diagram showing a file structure according to a modification of the present invention;

FIG. 9 is a diagram for explaining a common typeface file in FIG. 8;

FIGS. 23A and 23B are diagrams for explaining character interpolation and combination;

FIG. 25 is an explanatory diagram of prior art; and

FIG. 26 is a diagram for explaining problems of the prior art.

DETAILED DESCRIPTION OF THE PREFERRED EMBODIMENTS

Figure 1:
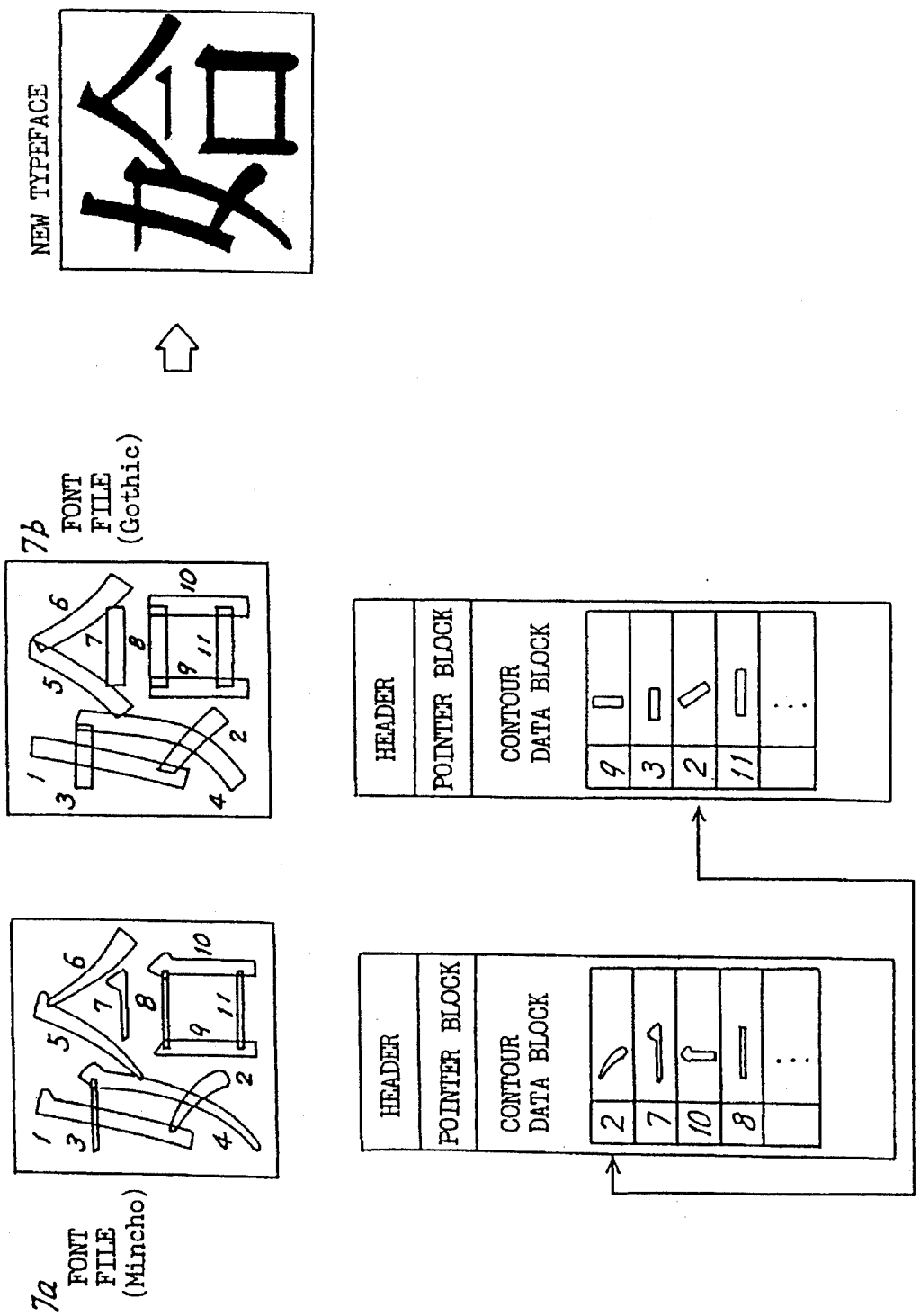
FIG. 1 is a diagram illustrating the principle of the present invention.

FIG. 1 is a diagram illustrating the principle of the present invention.

As shown in FIG. 1, individual font files 7a and 7b store data of part patterns (contour point data) together with code data in a contour data block where part patterns are stored. The corresponding part patterns among the part patterns stored in the font files 7a and 7b have the same code data. That is, the same code data is affixed to corresponding part patterns among the part patterns stored in the font files 7a and 7b. At the time of combining typefaces, part patterns or contour points are associated with one another based on the code data. This scheme can facilitate the association of part patterns or contour points of a plurality of typefaces with one another, thus ensuring easy character combination.

Figure 2:
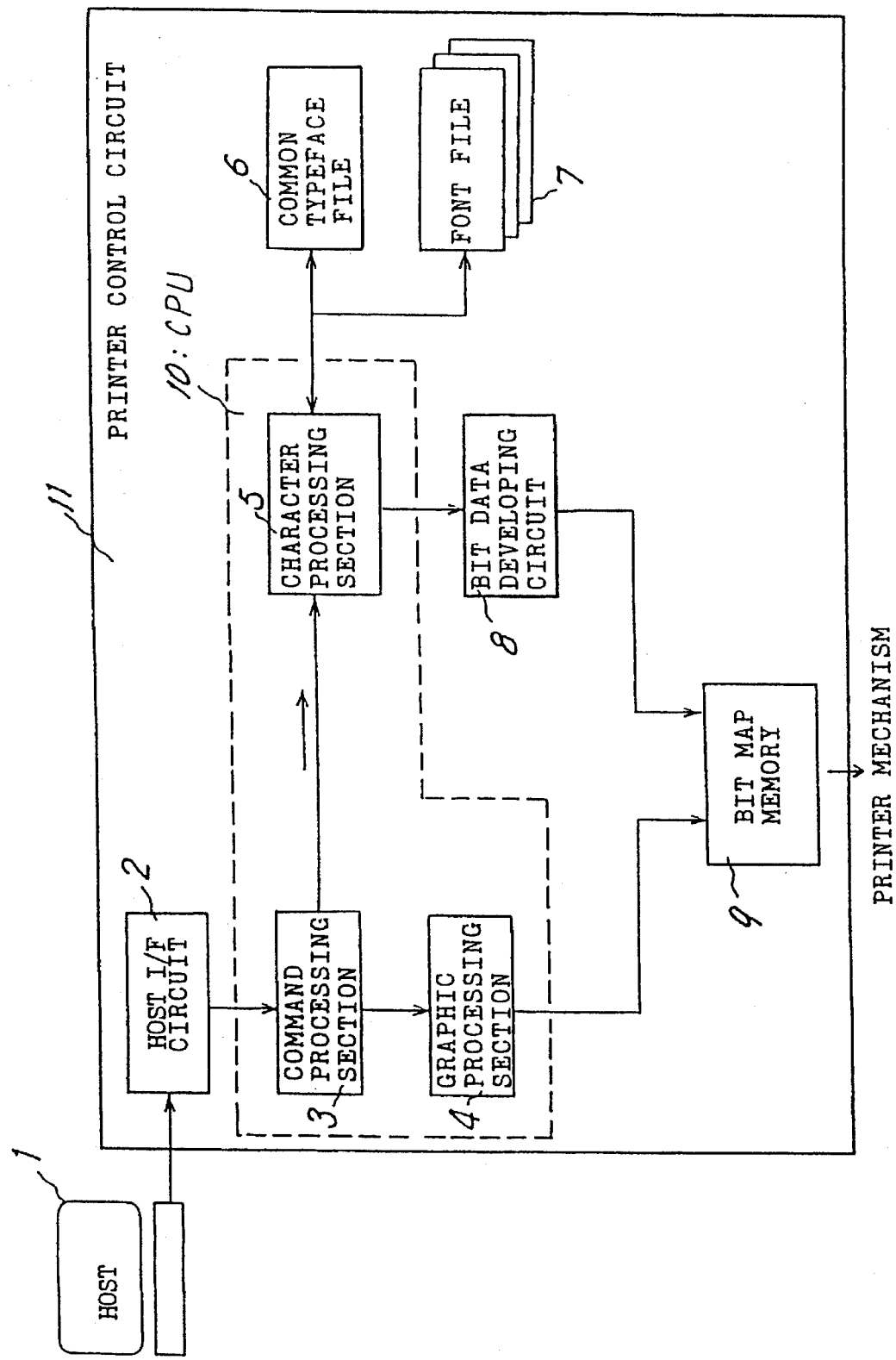
FIG. 2 is a structural diagram of one embodiment of the present invention.
Figure 3:
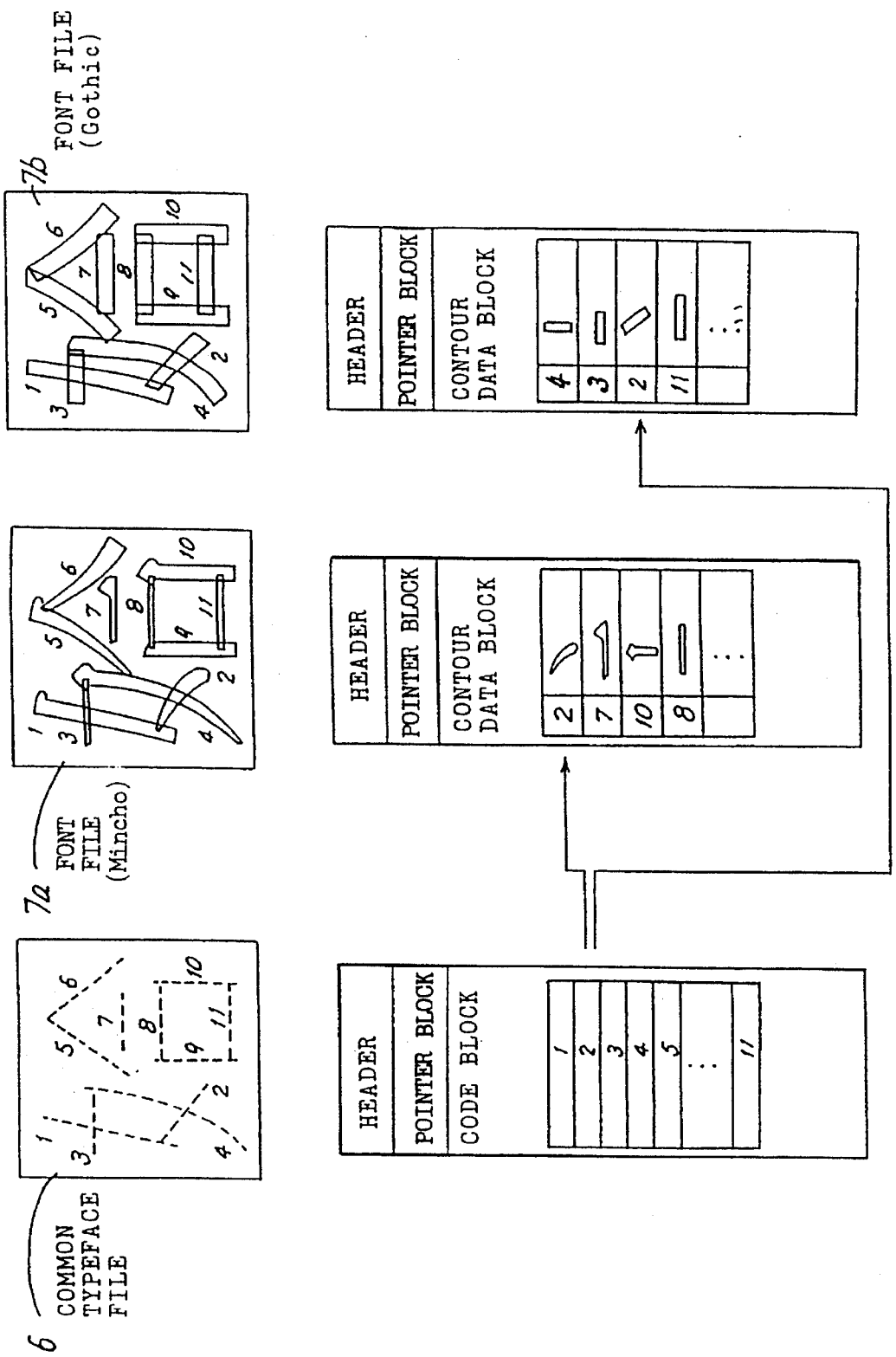
FIG. 3 is a diagram showing a file structure according to this embodiment.
Figures 4A, 4B:
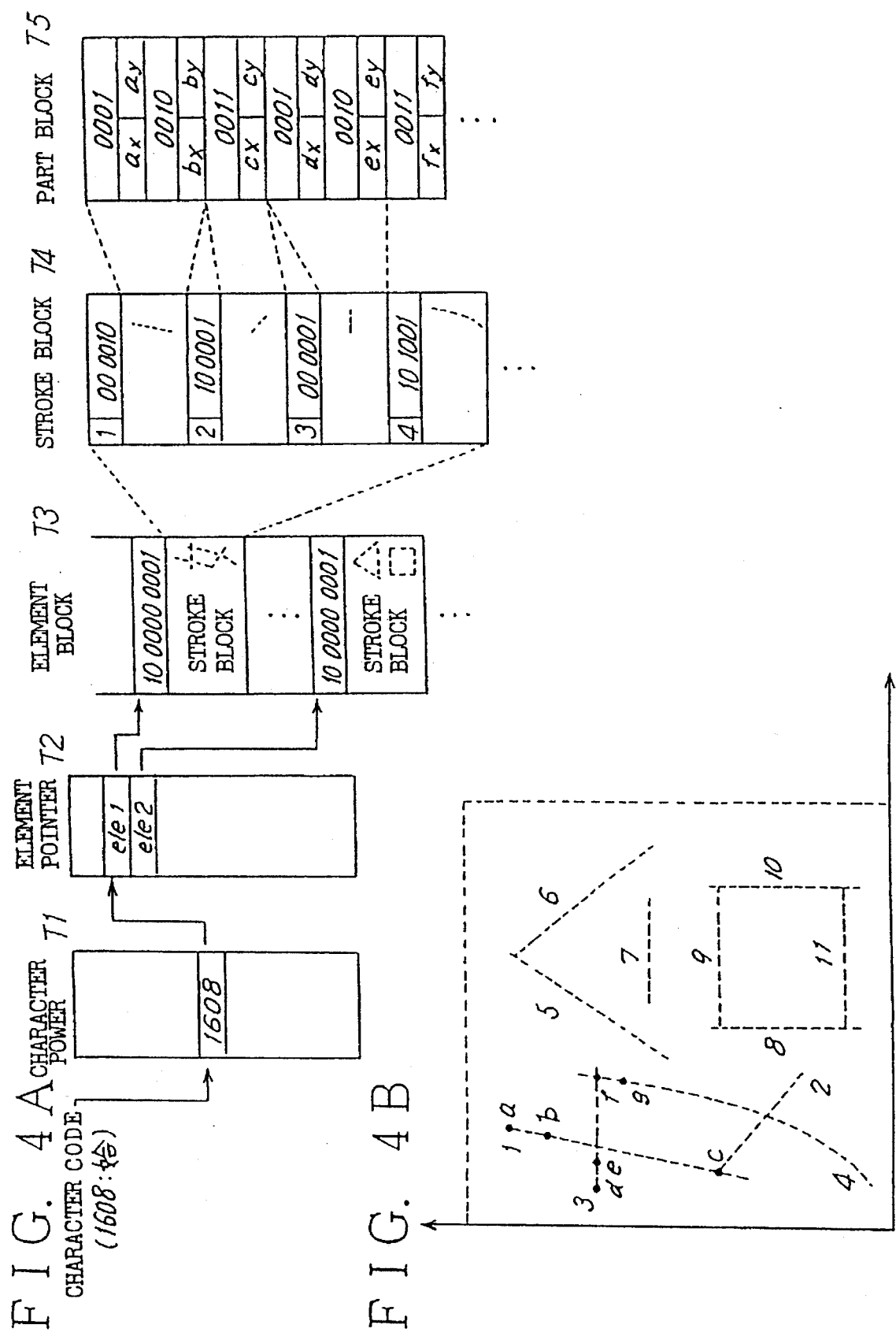
FIGS. 4A and 4B are diagrams for explaining a common typeface file in FIG. 3.
Figure 5A:
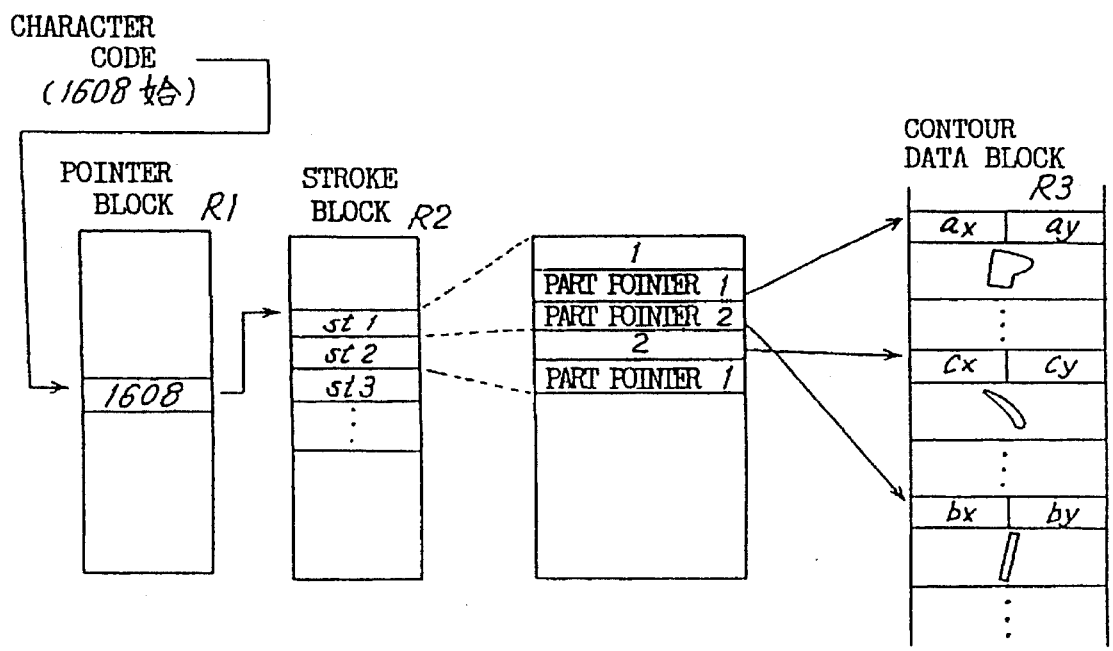
FIGS. 5A and 5B are diagrams for explaining a Mincho typeface file in FIG. 3.
Figure 5B:
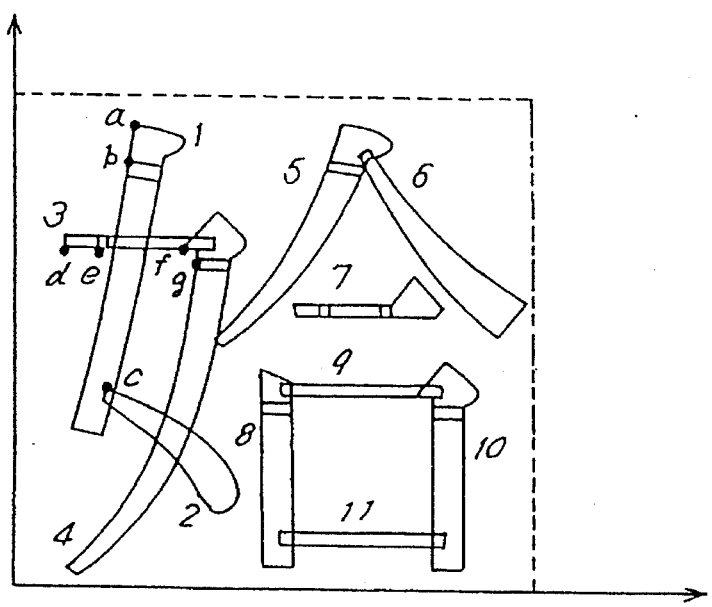
Figure 6A:
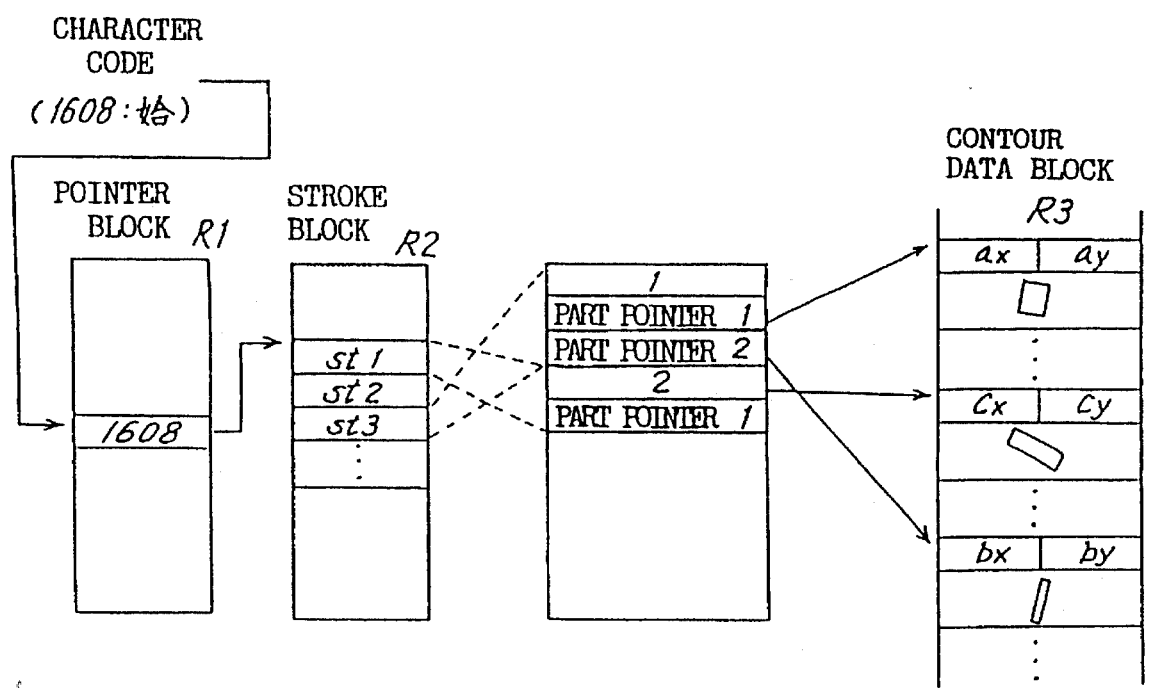
FIGS. 6A and 6B are diagrams for explaining a Gothic typeface file in FIG. 3.
Figure 6B:
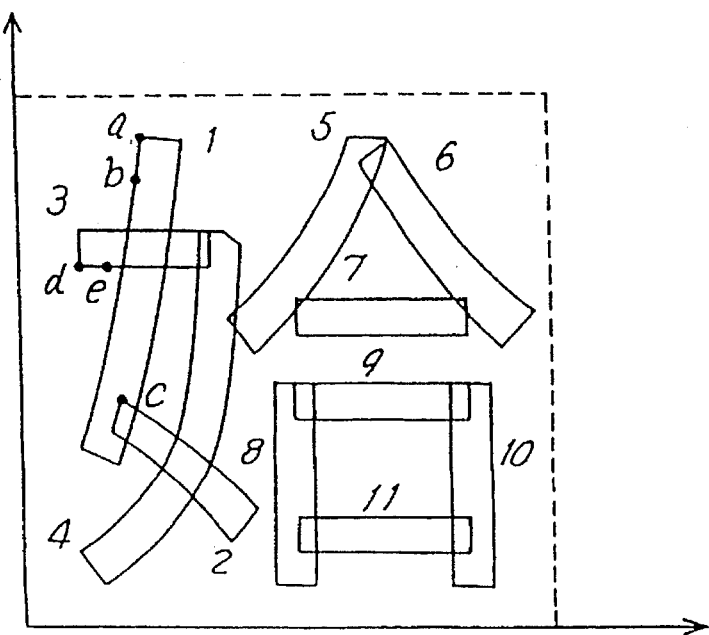
Figure 7:
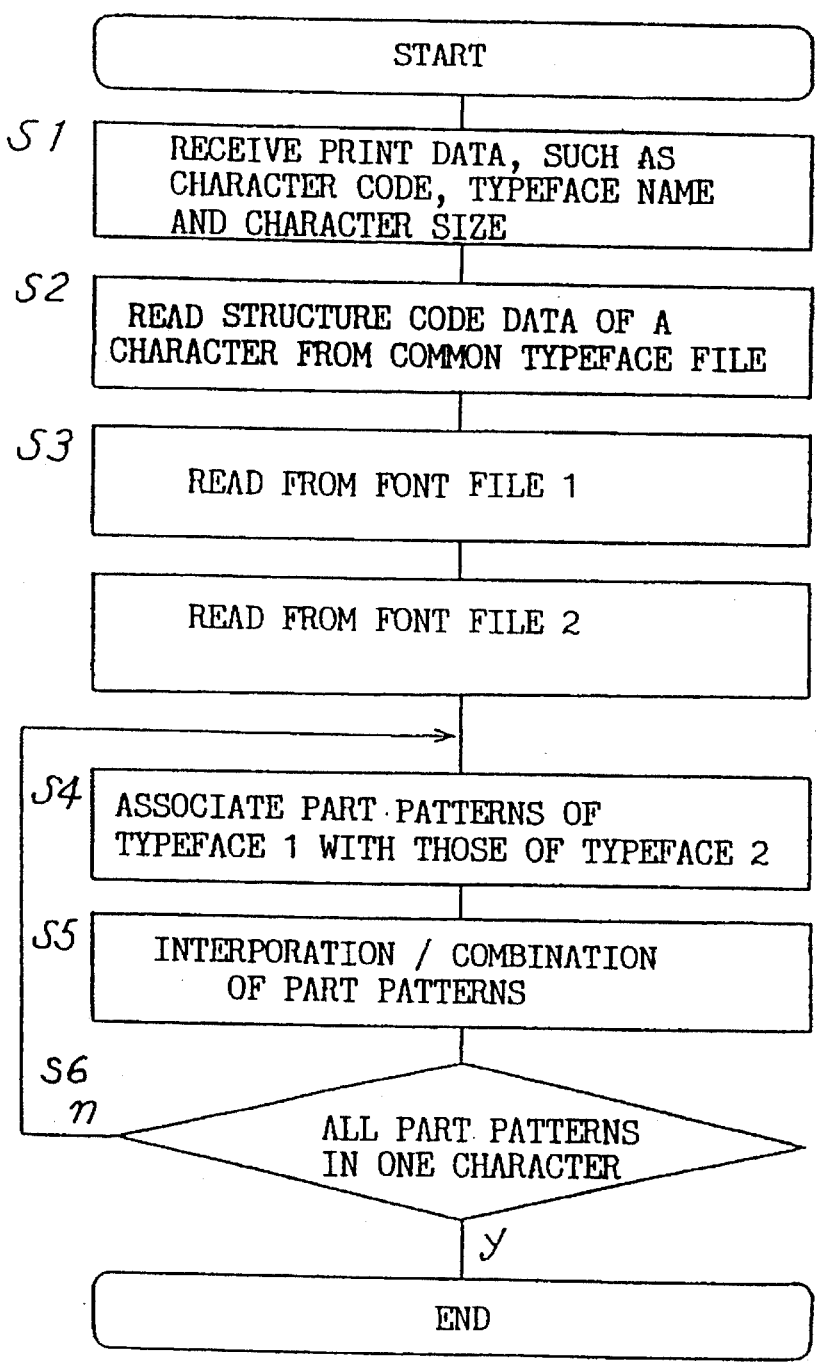
FIG. 7 is a flowchart illustrating a typeface combining process according to one embodiment of the present invention.

FIG. 2 is a structural diagram of one embodiment of the present invention, FIG. 3 shows a file structure according to this embodiment in FIG. 2, FIGS. 4A and 4B shows a common typeface file in FIG. 3, FIGS. 5A and 5B are diagrams for explaining a Mincho typeface file in FIG. 3, FIGS. 6A and 6B are diagrams for explaining a Gothic typeface file in FIG. 3, and FIG. 7 presents a flowchart illustrating a typeface combining process according to one embodiment of the present invention.

In FIG. 2, a host machine 1, constituted of a personal computer, a word processor or the like, sends print data to a printer control circuit 11. The printer control circuit 11 controls the printer mechanism in accordance with an instruction from the host machine 1. The printer control circuit 11 includes a host interface circuit 2, a command processing section 3, a graphics processing section 4, and a character processing section 5. The host interface circuit 2 controls an interface with the host machine 1. The command processing section 3 discriminates if the print data from the host machine 1 is graphics data or character data.

The graphics processing section 4 prepares bit data of a figure in accordance with the graphics data from the command processing section 3. The character processing section 5 reads the necessary structure data and typeface data specific to each typeface from a common typeface data memory 6 and a font file memory 7 (both of which will be described later) in accordance with the character data (character code, character size and font name), and prepares character data of an outline format.

The common typeface data memory (hereinafter referred to as "common typeface file") 6 stores information common to typefaces of each character (data of common start points, structure data, etc.). The font file memory 7 stores typeface data specific to the individual typefaces. A bit data developing circuit 8, which is constituted of a known drawing LSI, develops character data of an outline format into character bit data. A bit map memory 9 is a memory in or from which graphics bit data and character bit data are written or read out, and the read-out data is output to the printer mechanism (not shown) to be printed.

A CPU (Central Processing Unit) 10 performs the functions of the command processing section 3, graphics processing section 4 and character processing section 5. In other words, the command processing section 3, graphics processing section 4 and character processing section 5 represent the functions of the CPU 10 as blocks.

As shown in FIG. 3, stored in the common typeface file 6 are structure data of strokes constituting each character and common typeface structure codes in order to specify the skeleton of that character. For the illustrated Kanji character "Ai," for example, data of eleven strokes constituting the Kanji character "Ai" and its common typeface structure codes "1" to "11" are stored in a code block.

The font file memory 7 has the aforementioned font files 7a and 7b for individual typefaces as shown in FIG. 3. The contour data blocks for the individual strokes in the font files 7a and 7b each contain contour data of each stroke and common typeface structure codes affixed to corresponding strokes. For the illustrated Kanji character "Ai," the font file 7a for Mincho characters stores contour data of strokes of each Mincho character with common typeface structure codes affixed thereto. Likewise, the font file 7b for Gothic characters stores contour data of strokes of each Gothic character with common typeface structure codes affixed thereto. The common typeface structure codes indicate corresponding strokes.

The file structure will be described more specifically. As shown in FIG. 4A, the common typeface file 6 has a character pointer block T1, an element pointer block T2 and an element block T3. The character pointer block T1 stores pointers to the element pointer block T2 which are associated with character codes. The element pointer block T2 stores pointers of elements to the element block T3, which constitute the character specified by the character code. The element block T3 stores element codes of elements constituting each character and stroke blocks T4 for the elements.

The stroke block T4 in the illustration contains common typeface structure codes "1" to "4," classification codes of strokes and part blocks T5. Each part block T5 stores classification codes of parts and positional data of common absolute origins of the parts.

For example, the Kanji character "Ai" in FIG. 4B has two elements "Onna" and "Au" which are radicals, the element pointer block T2 has two pointers (ele1 and ele2), which indicate the locations of data of the elements "Onna" and "Au" in the element block T3. The element block T3 contains the classification code of the element "Onna" and the stroke block T4 for this element.

The stroke block T4 contains data of individual strokes constituting the element "Onna." More specifically, the stroke block T4 contains the classification codes of the four strokes constituting the element "Onna," the common typeface structure codes "1" to "4" and the part block T5 which contains data of individual parts constituting each of the strokes. The part block T5 contains the classification codes of the parts constituting each stroke and the coordinates of the absolute origins of the parts.

In the illustrated example, the first stroke (oblique downward line) of the element "Onna" has a classification code of "000010" affixed with the common typeface structure code "1." This oblique stroke consists of two parts (classification codes "0001" and "0010") whose common absolute origins are (ax, ay) and (bx, by).

The Mincho font file 7a has a pointer block R1 and a stroke block R2 as shown in FIG. 5A. The pointer block R1 stores stroke pointers to a stroke block R2 associated with each character code. The stroke block R2 stores part pointers indicating contour data blocks R3 of the parts constituting each stroke. The contour data block R3 stores a layout position expressed by a relative absolute position (offset value) from the absolute origin of each part and contour data of the Mincho part at the position specified by each part pointer.

The Mincho character "Ai" shown in FIG. 5B, therefore, has a file structure as shown in FIG. 5A and the common typeface structure code "1" is affixed to the stroke 1 (oblique stroke).

The Gothic font file 7b has a pointer block R1 and a stroke block R2 as shown in FIG. 6A. The pointer block R1 stores stroke pointers in a stroke block R2 associated with each character code. The stroke block R2 stores part pointers indicating contour data blocks R3 of the parts constituting each stroke. The contour data block R3 stores a layout position expressed by a relative absolute position (offset value) from the absolute origin of each part and contour data of the Gothic part at the position specified by each part pointer.

Therefore, the Gothic character "Ai" shown in FIG. 6B has a file structure as shown in FIG. 6A and the common typeface structure code "1," which is the same as the one used for the Mincho Kanji character, is affixed to the stroke 1 (oblique stroke).

In this embodiment, a part pattern is divided into parts, which are arranged in the stroking order. The strokes are arranged regardless of the stroking order. Common structure codes common to individual typefaces are affixed to the strokes. Further, the common typeface file 6 stores the structure data of the elements constituting each character, strokes and parts, and the positions of the absolute origins of the parts. Each font file 7 stores the common typeface structure codes of strokes and contour data of parts.

Even if the strokes are not arranged in order, therefore, the same strokes in Mincho and Gothic characters are associated with one another by the common typeface structure codes. Since the positions of the absolute origins of the parts are stored in the common typeface file 6, those positions can be shared by individual typefaces. That is, the contour points of parts for each typeface should only be expressed by relative positions (offset values) from the positions of the absolute origins.

The relative position may be expressed by one byte. The prior art which has no data of the common absolute origins requires 2-byte data of the coordinates of the start position of each part for each typeface. If each part of each typeface is given the common absolute origin for individual typefaces, this part has 1-byte data of the relative position and needs 2-byte data of the common absolute origin in addition. If there are three typefaces, therefore, the prior art which has no data of the common absolute origins requires six bytes for start point data, whereas the present invention using data of the common absolute origins requires two plus three bytes, a total of five bytes. The amount of required data can be reduced by one byte for each part. As the aforementioned Kanji character "Ai" has eleven parts, a total of eleven bytes can be reduced.

FIG. 7 is a flowchart illustrating a typeface combining process according to one embodiment of the present invention.

(S1) First, the host machine 1 sends print data to the printer control circuit 11. This print data designates a typeface, a character, the size of the character and a figure. The host interface circuit 2 decodes the print data and sends the decoded data to the command processing section 3. The command processing section 3 sends graphics print data to the graphics processing section 4 and character print data to the character processing section 5, respectively. The graphics processing section 4 develops the graphics data to graphics bit data and writes it into the bit map memory 9. The character processing section 5 develops a character by a process shown in FIG. 15. The character processing section 5 reads the character code (section code), the font name and the character size.

(S2) The character processing section 5 then reads the associated element blocks T3 (the element codes, the common typeface structure codes of strokes, the classification of the strokes, the part codes and the common start positions) from the common typeface file 6 based on the character code.

(S3) Then, the character processing section 5 reads the associated stroke blocks R2 (the common typeface structure codes of the strokes) and the contour data blocks R3 (the coordinates of the relative positions of the parts (offset values) and contour data) from the first font file 7a based on the character code and the font name. Likewise, the character processing section 5 reads the associated stroke blocks R2 (the common typeface structure codes of the strokes) and the contour data blocks R3 (the coordinates of the relative positions of the parts (offset values) and contour data) from the second font file 7b based on the character code and the font name.

(S4) The character processing section 5 searches the strokes which have the same common typeface structure codes in the common typeface file 6 between the strokes in the font files 7a and 7b and associates those strokes with one another.

(S5) After establishing the stroke association, the character processing section 5 computes the absolute coordinates of the individual parts of the corresponding strokes. That is, the absolute position of the start point of each part is computed by adding an offset value to the common absolute origin. Since the individual parts are arranged in the stroking order in each stroke and the contour points are also arranged in the stroking order in each part, the contour points of each of the parts of each stroke can be associated between different typefaces.

Then, the character processing section 5 computes the coordinates of middle points of the coordinates of the contour points of the parts of the corresponding strokes to acquire the contour points of individual parts of each stroke of a character of an interpolated or combined typeface.

(S6) The character processing section 5 then determines if the above processing is complete for all the strokes in one character. The flow returns to step S4 when the processing has not been completed, and will be terminated when the processing is completed.

The character data of the thus produced new typeface is stored as a new typeface in the font file memory 7.

The generation of a character pattern is performed as follows. The character processing section 5 reads the associated element blocks T3 (the element codes, the common typeface structure codes of strokes, the classification of the strokes, the part codes and the common start positions) from the common typeface file 6 based on the character code. Then, the character processing section 5 reads the associated stroke blocks R2 (the common typeface structure codes of the strokes) and the contour data blocks R3 (the coordinates of the relative positions of the parts (offset values) and contour data) from the associated font files 7 based on the character code and the font name.

The character processing section 5 computes the absolute coordinates of the individual parts of the strokes. That is, the absolute position of the start point of each part is computed by adding an offset value to the common absolute origin. The data of the absolute coordinates of the parts are sent to the bit data developing circuit 8. The bit data developing circuit 8 writes contour points at the absolute coordinates to draw the contour of each stroke and fills up inside the contour, thus generating a character pattern, and writes the character pattern into the bit map memory 9. When one page of bit data is written in the bit map memory 9, this data is sent to the printing mechanism to be printed out.

As the same common typeface structure codes are affixed to corresponding strokes of each character between different typefaces, the association of the strokes between different typefaces can easily be achieved to ensure accurate and fast character interpolation and combination.

AS the positions of the absolute origins of the parts are stored in the common typeface file 6 and the offset values of the individual parts and contour data are stored typeface by typeface, each typeface has only to have the offset values as positional data, thus reducing the amount of the required memory capacity. The common typeface file 6 should neither reflect any existing character designs nor store readable characters, but simply needs to store positional data of the start points of contour line elements.

Figure 10:
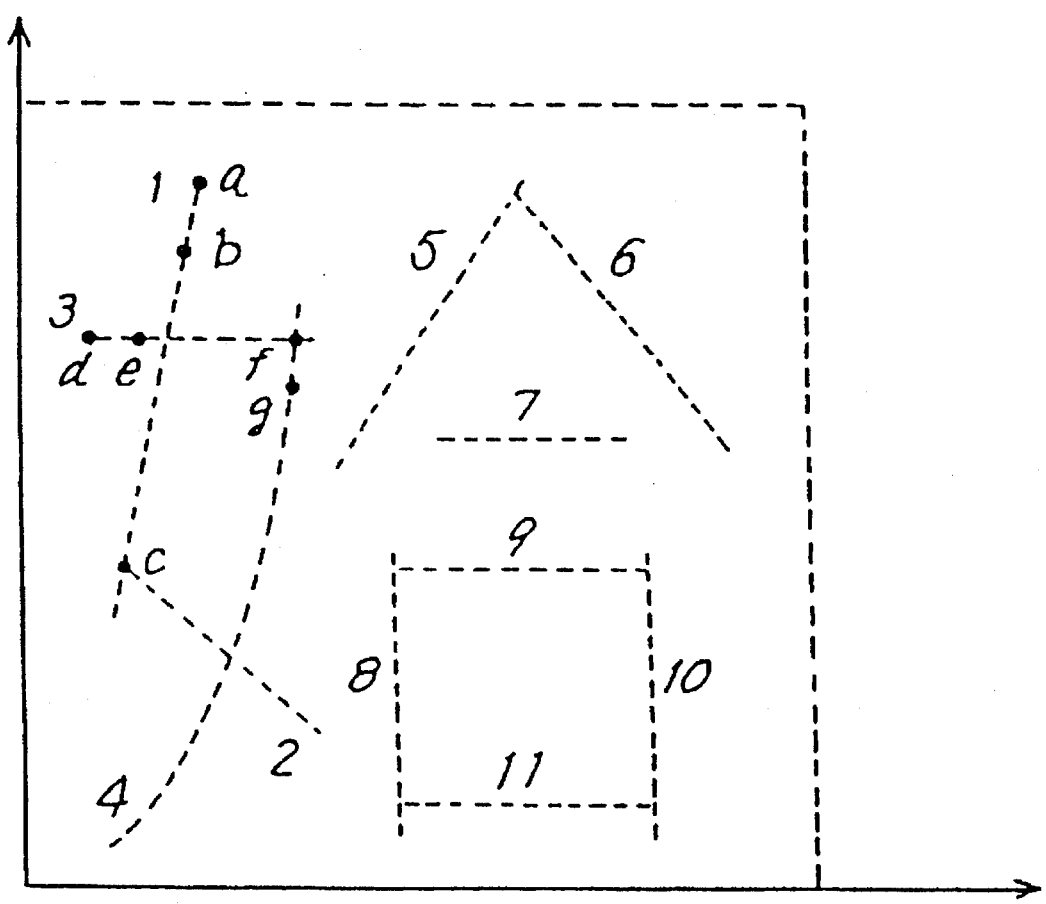
FIG. 10 is a diagram for explaining the common typeface file in FIG. 9.
Figure 11:
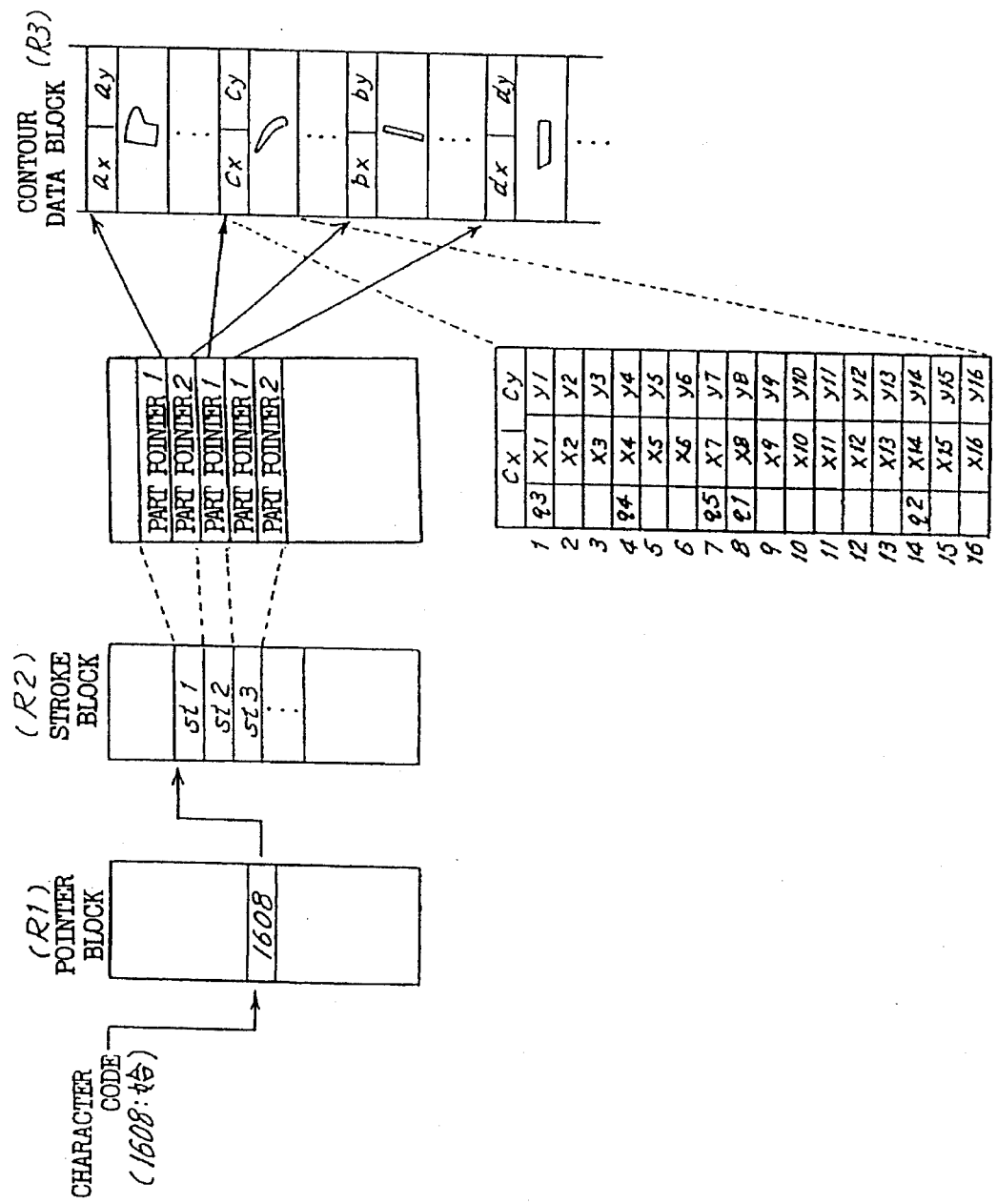
FIG. 11 is a diagram for explaining a Mincho typeface file in FIG. 9.
Figure 12A:
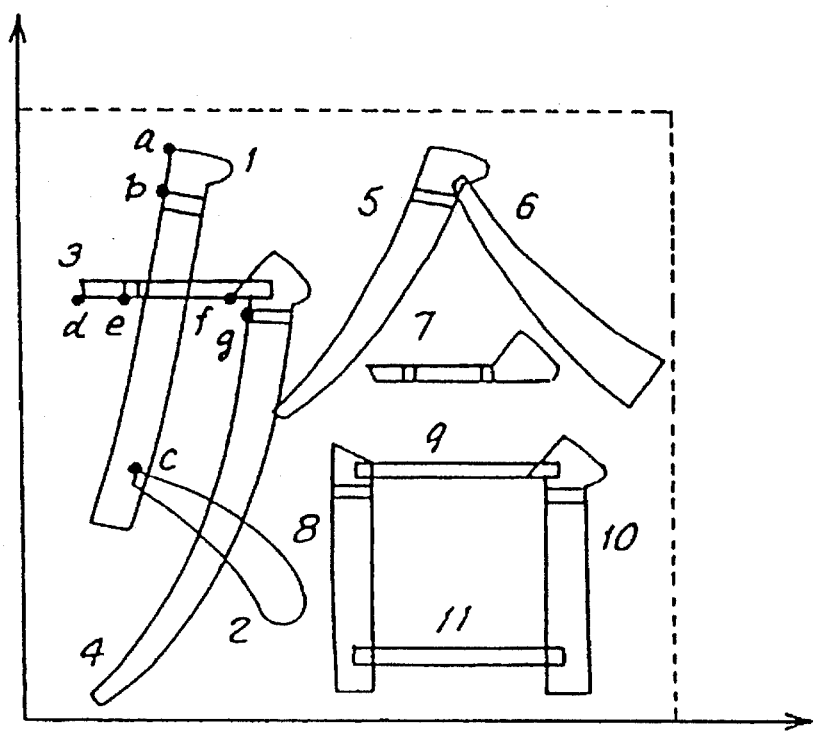
FIGS. 12A and 12B are diagrams for explaining the Mincho typeface file in FIG. 11.
Figure 12B:
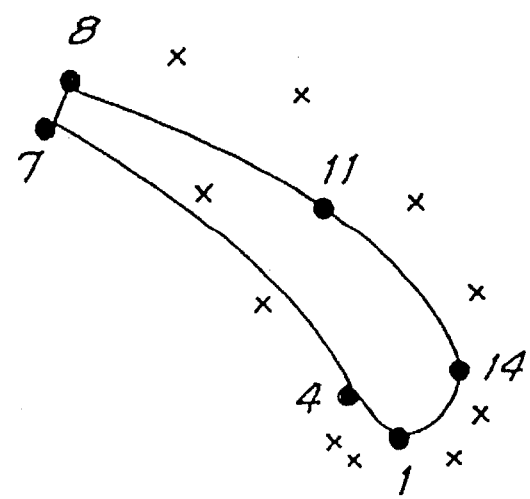
Figure 13:
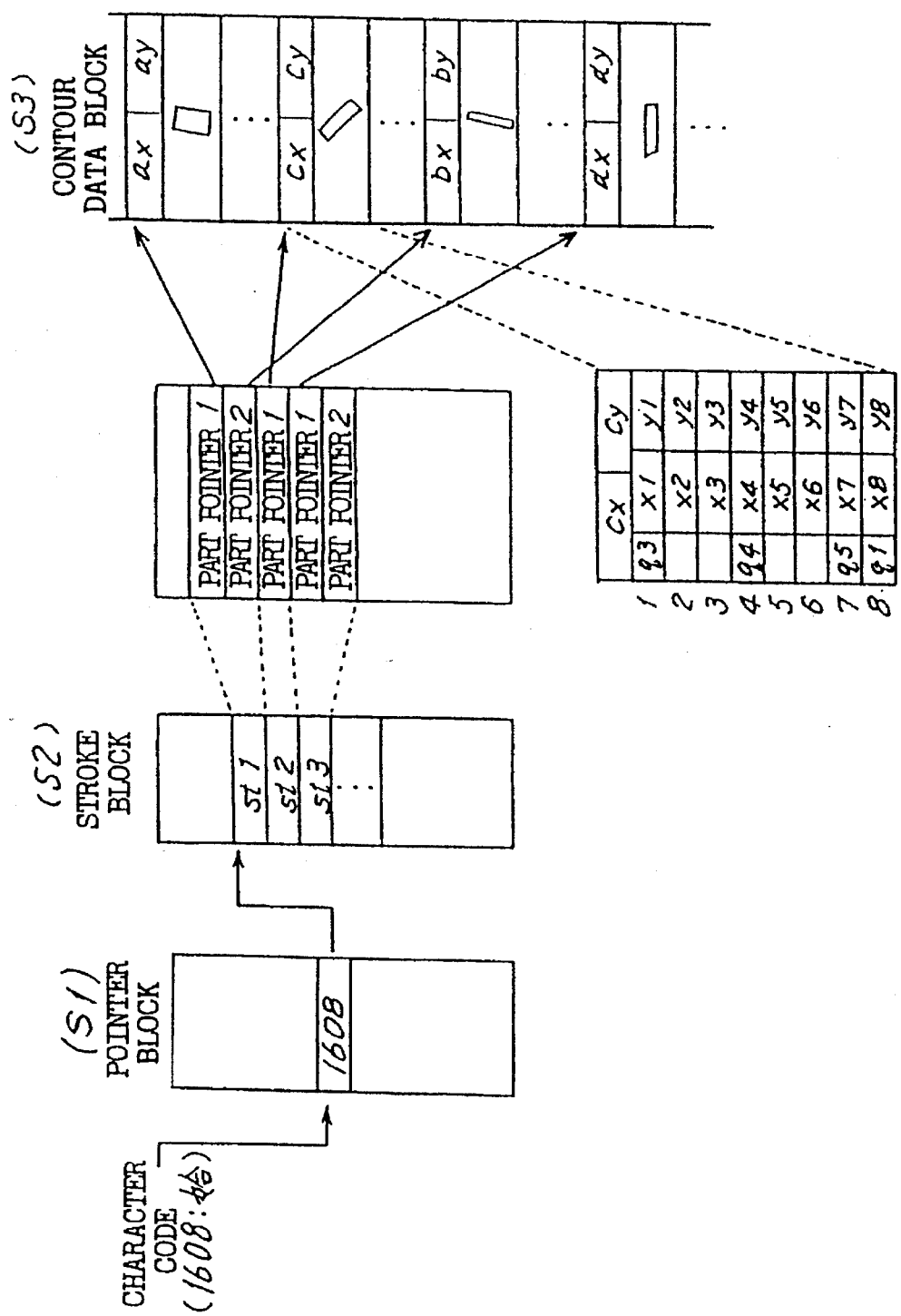
FIG. 13 is a diagram for explaining a Gothic typeface file in FIG. 9.
Figure 14A:
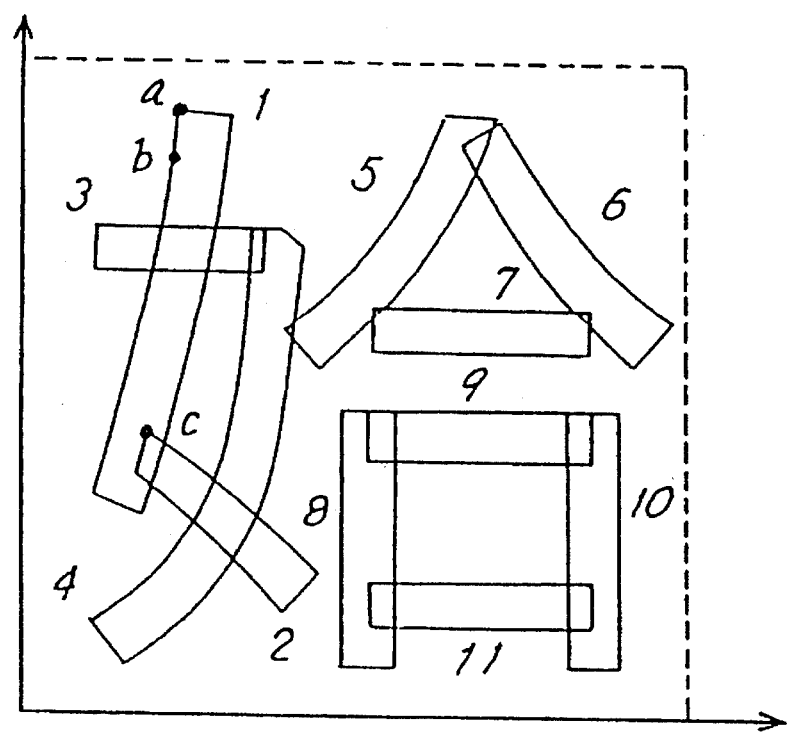
FIGS. 14A and 14B are diagrams for explaining the Gothic typeface file in FIG. 13.
Figure 14B:
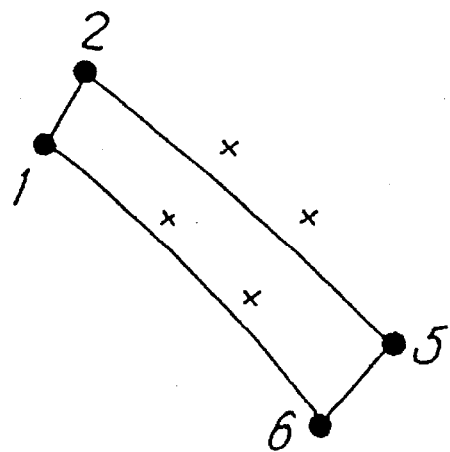
Figure 15:
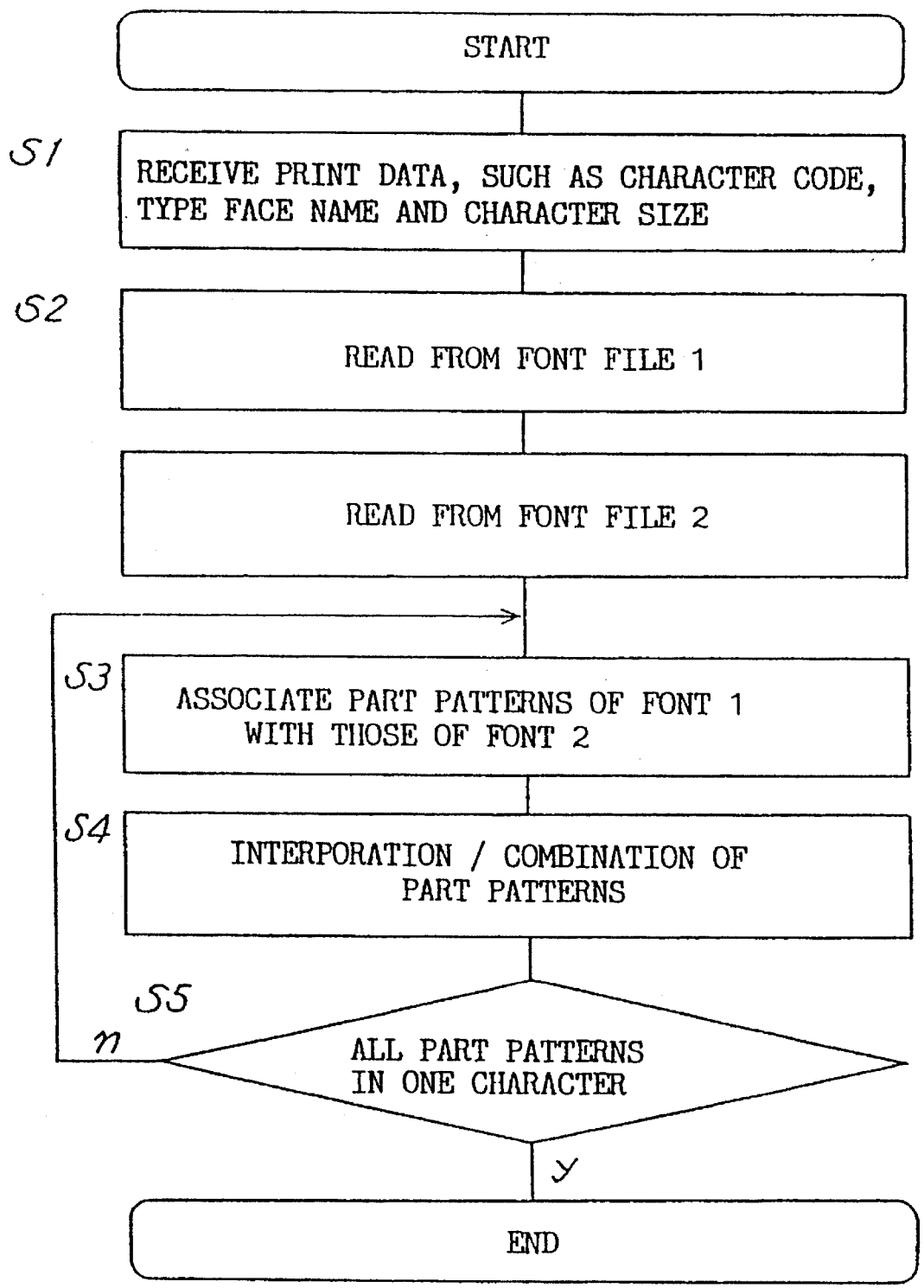
FIG. 15 is a flowchart illustrating a typeface combining process according to the modification of the present invention.

FIG. 8 shows a file structure according to a modification of the present invention, FIG. 9 shows the structure of a common typeface file in FIG. 8, FIG. 10 is a diagram for explaining the common typeface file in FIG. 9, FIG. 11 shows the structure of a Mincho typeface file in FIG. 9, FIGS. 12A and 12B are diagrams for explaining the Mincho typeface file in FIG. 11, FIG. 13 shows the structure of a Gothic typeface file in FIG. 8, FIGS. 14A and 14B are diagrams for explaining the Gothic typeface file in FIG. 13, and FIG. 15 is a flowchart illustrating a typeface combining process according to the modification of the present invention.

According to this modification, specific contour point codes common to the individual typefaces are added to corresponding contour points of each part between the typefaces, and the strokes and parts are arranged in order. As shown in FIG. 8, the common typeface file 6 is provided with a pointer block where a pointer to a code block storing the code of each character is stored, a code block storing classification codes "09" to "04" of strokes a to k constituting of that character and a characterizing point block storing characterizing point codes of characterizing points among contour points of parts for each part type.

As shown in FIG. 8, a characterizing point code is affixed to contour data (X coordinate, Y coordinate) of each part in the contour data block of this part in each of the font files 7a and 7b in the font file memory 7. For the illustrated Kanji character "Ai," characterizing point codes (r, s, t, p and q) are affixed to the characterizing contour points (contour points 1, 4, 7, 8 and 14 in this example) among the contour points of each part of a Mincho character in the Mincho font file 7a. Likewise, characterizing point codes (t, p, q and s) are affixed to the characterizing contour points (contour points 1, 2, 5 and 6 in this example) among the contour points of each part of a Gothic character in the Gothic font file 7b.

The part b having the shape of a "drop" consists of sixteen contour points in the Mincho font file 7a and eight contour points in the Mincho font file 7b. The five contour points among the sixteen contour points in the Mincho font file 7a correspond, as characterizing points, to the five characterizing points stored in the common typeface file 6, and the four contour points among the eight contour points in the Gothic font file 7b correspond, as characterizing points, to the five characterizing points stored to the common typeface file 6.

The above will be described more specifically. As shown in FIG. 9, the common typeface file 6 has a character pointer block T1, an element pointer block T2 and an element block T3. The character pointer block T1 stores pointers to the element pointer block T2 which are associated with character codes. The element pointer block T2 stores pointers of elements to the element block T3, which constitute the character specified by the character code. The element block T3 stores element codes of elements constituting each character and stroke blocks T4 for the elements.

The stroke block T4 in the illustration contains classification codes of strokes, part blocks T5 and characterizing code blocks T6 each storing the characterizing point codes of the contour points of each part. Each part block T5 stores classification codes of parts and positional data of common absolute origins of the parts.

For example, the Kanji character "Ai" in FIG. 10 has two elements "Onna" and "Au" which are radicals, the element pointer block T2 has two pointers (ele1 and ele2), which indicate the locations of data of the elements "Onna" and "Au" in the element block T3. The element block T3 contains the classification code of the element "Onna" and the stroke block T4 for this element.

The stroke block T4 contains data of individual strokes constituting the element "Onna." More specifically, the stroke block T4 contains the classification codes of the four strokes constituting the element "Onna," and the part block T5 which contains data of individual parts constituting each of the strokes. The part block T5 contains the classification codes of the parts constituting each stroke and the coordinates of the absolute origins of the parts. The characterizing point code block T6 stores the characterizing point codes for those characterizing points which constitute each part.

In the illustrated example, the second stroke (rightward and downward oblique line) having the shape of a "drop" (hereinafter simply referred to as "drop") of the element "Onna" has a classification code of "100001." This stroke "drop" is indicated to consist of one part (classification code "0011") and its common absolute origin is (cx1, cy1). This part "drop" has five characterizing points q1, q2, q3, q4 and q5 as apparent from the lower portion in the characterizing point code block T6 in FIG. 9.

The Mincho font file 7a has a pointer block R1 and a stroke block R2 as shown in FIG. 11. The pointer block R1 stores stroke pointers to a stroke block R2 associated with each character code. The stroke block R2 stores part pointers indicating contour data blocks R3 of the parts constituting each stroke. The contour data block R3 stores a layout position expressed by a relative absolute position (offset value) from the absolute origin of each part and contour data of the Mincho part at the position specified by each part pointer. Contour point codes are affixed to the contour data.

The Mincho character "Ai" shown in FIG. 12A, therefore, has a file structure as shown in FIG. 11. The contour point codes q3, q4, q5, q1 and q2 are affixed to the five characterizing contour points 1, 4, 7, 8 and 14 among the sixteen contour points constituting the Mincho part "drop" shown in FIG. 12B.

As shown in FIG. 13, the Gothic font file 7b has the same structure as shown in FIG. 11. The Gothic character "Ai" shown in FIG. 14A, therefore, has a file structure as shown in FIG. 13. The contour point codes q3, q4, q5 and q1 are affixed to the four characterizing contour points 1, 4, 7 and 8 among the eight contour points constituting the Gothic part "drop" shown in FIG. 12B.

In this embodiment, a part pattern is divided into parts, and the strokes and parts are arranged in the stroking order. The number of contour points on each part varies from one typeface from another, and contour point codes are affixed to corresponding contour points among the different number of contour points. Further, the common typeface file 6 stores the structure data of the elements constituting each character, strokes and parts, and the positions of the absolute origins of the parts. Each font file 7 stores the contour data of parts.

Even if the number of contour points differs between Mincho and Gothic or the order of the contour points differs between Mincho and Gothic (even if the start positions differ or the directions differ), therefore, the corresponding contour points between Mincho and Gothic are associated with one another by the contour point codes. Since the positions of the absolute origins of the parts are stored in the common typeface file 6, those positions can be shared by individual typefaces. That is, the contour points of parts for each typeface should only be expressed by relative positions (offset values) from the positions of the absolute origins.

The typeface combining process will now be explained with reference to FIG. 15. The structure in this example is the same as the one shown in FIG. 2.

(S1) First, the host machine 1 sends print data to the printer control circuit 11. This print data designates a typeface, a character, the size of the character and a figure. The host interface circuit 2 decodes the print data and sends the decoded data to the command processing section 3. The command processing section 3 sends graphics print data to the graphics processing section 4 and character print data to the character processing section 5, respectively. The graphics processing section 4 develops the graphics data to graphics bit data and writes it into the bit map memory 9. The character processing section 5 develops a character by a process shown in FIG. 15. The character processing section 5 reads the character code (section code), the font name and the character size.

(S2) Then, the character processing section 5 reads the contour data blocks R3 (the coordinates of the relative positions of the parts (offset values) and contour data affixed with contour point codes) of the corresponding strokes, from the first font file 7a based on the character code and the font name. Likewise, the character processing section 5 reads the contour data blocks R3 (the coordinates of the relative positions of the parts (offset values) and contour data affixed with contour point codes) of the corresponding strokes, from the second font file 7b based on the character code and the font name.

(S3) The character processing section 5 searches the contour points which have the matched same contour point codes between the contour points of the font files 7a and 7b and associates those contour points with one another.

(S4) After establishing the stroke association, the character processing section 5 computes the absolute coordinates of the corresponding parts. That is, the character processing section 5 reads the corresponding element block T3 (element code, stroke classification codes, part codes and common start positions) from the common typeface file 6 based on the character code. Then, the absolute position of the start point of each part is computed by adding an offset value to the common absolute origin. Then, the character processing section 5 computes the coordinates of middle points of the coordinates of the contour points of the individual parts to acquire the contour points of individual parts of each stroke of a character of an interpolated or combined typeface.

(S5) The character processing section 5 then determines if the above processing is complete for all the strokes in one Character. The flow returns to step S4 when the processing has not been completed, and will be terminated when the processing is completed.

The character data of the thus produced new typeface is stored as a new typeface in the font file memory 7. The generation of a character pattern is carried out in the same manner as the one which has already been explained with reference to FIG. 7.

As the contour point codes are affixed to the corresponding contour points of the parts of each character, the association of the parts between different typefaces can easily be achieved to ensure accurate and fast character interpolation and combination.

Figure 16:
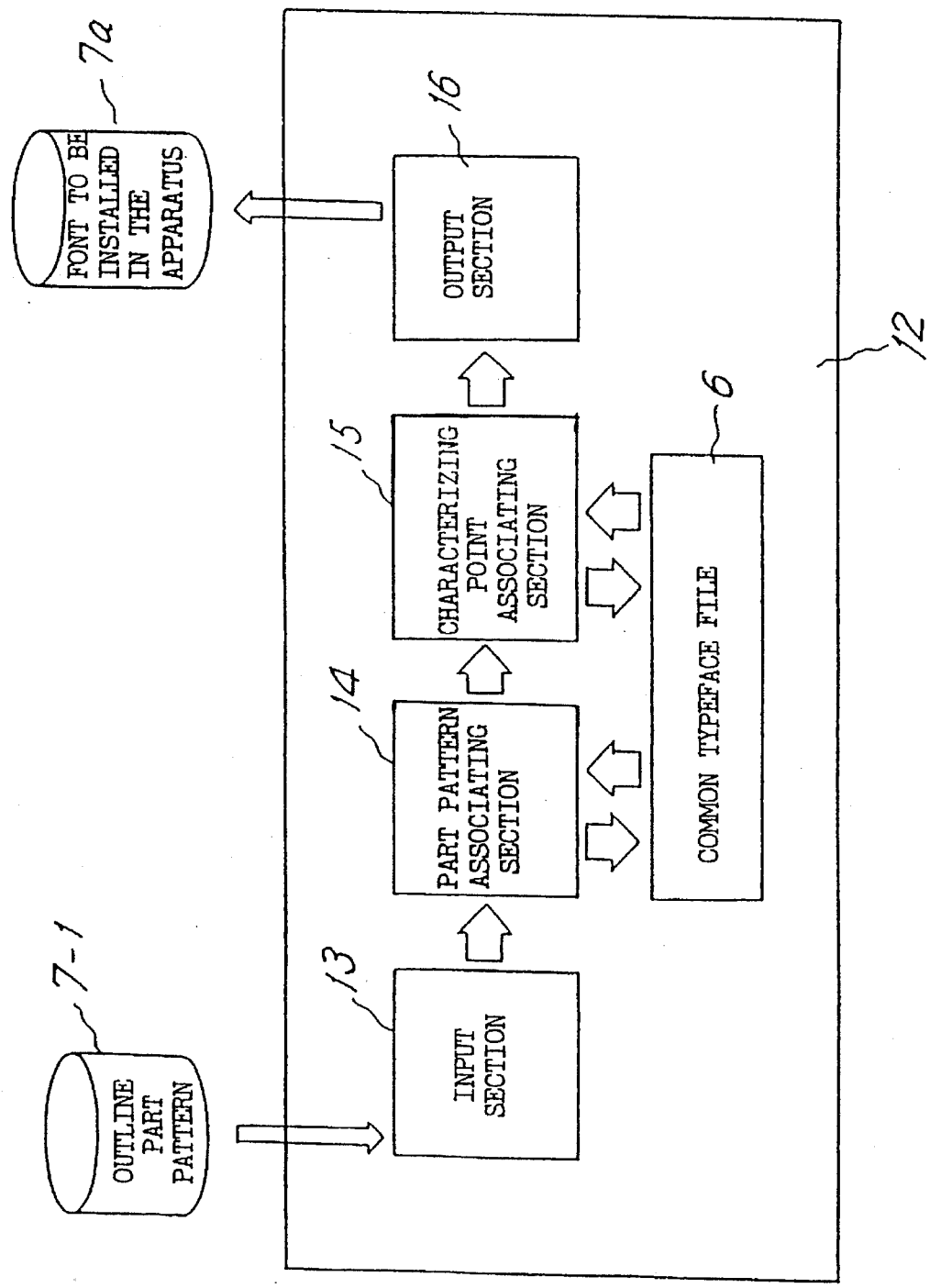
FIG. 16 is a block diagram showing another modification of the present invention.
Figure 17A:
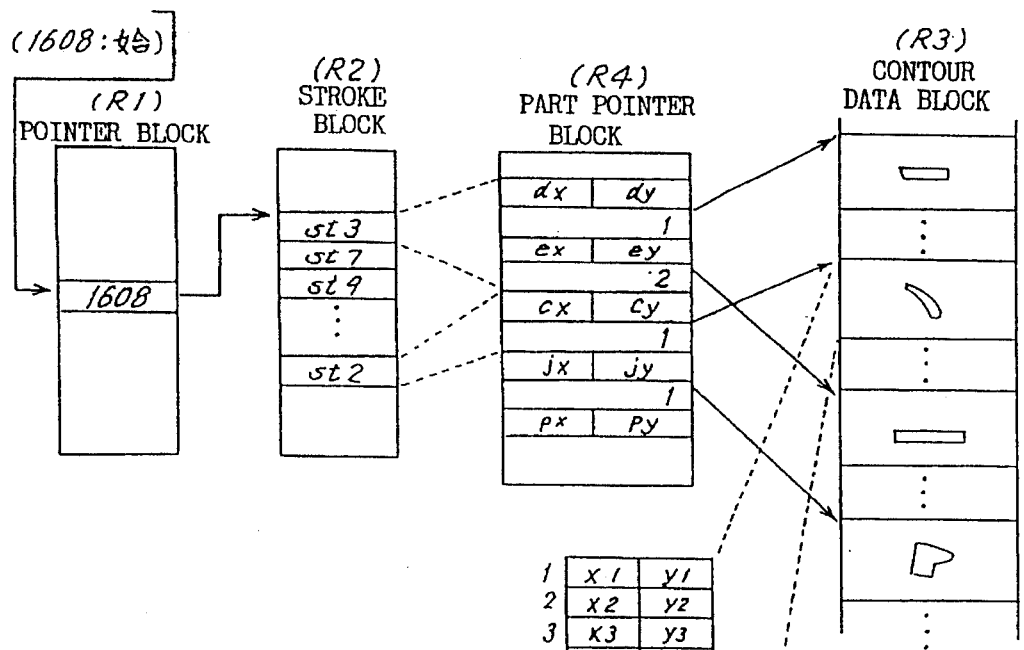
FIGS. 17A, 17B and 17C are diagrams for explaining a typeface file in FIG. 16.
Figure 17B:
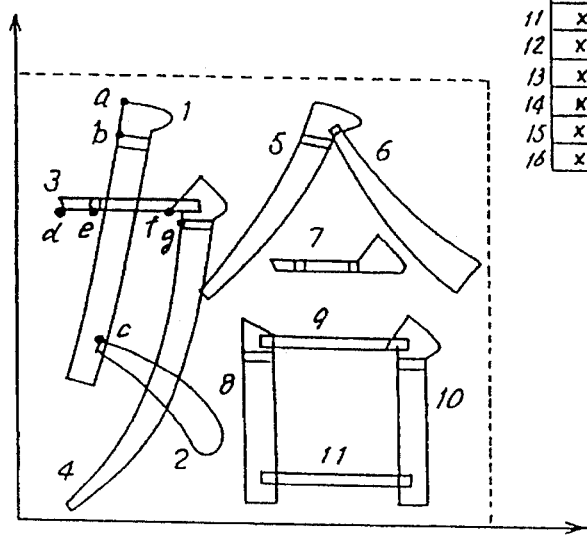
Figure 17C:
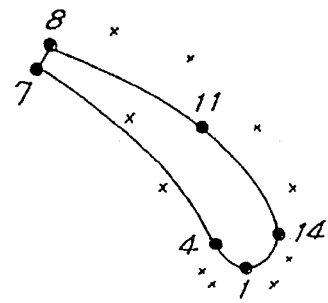
Figure 18:
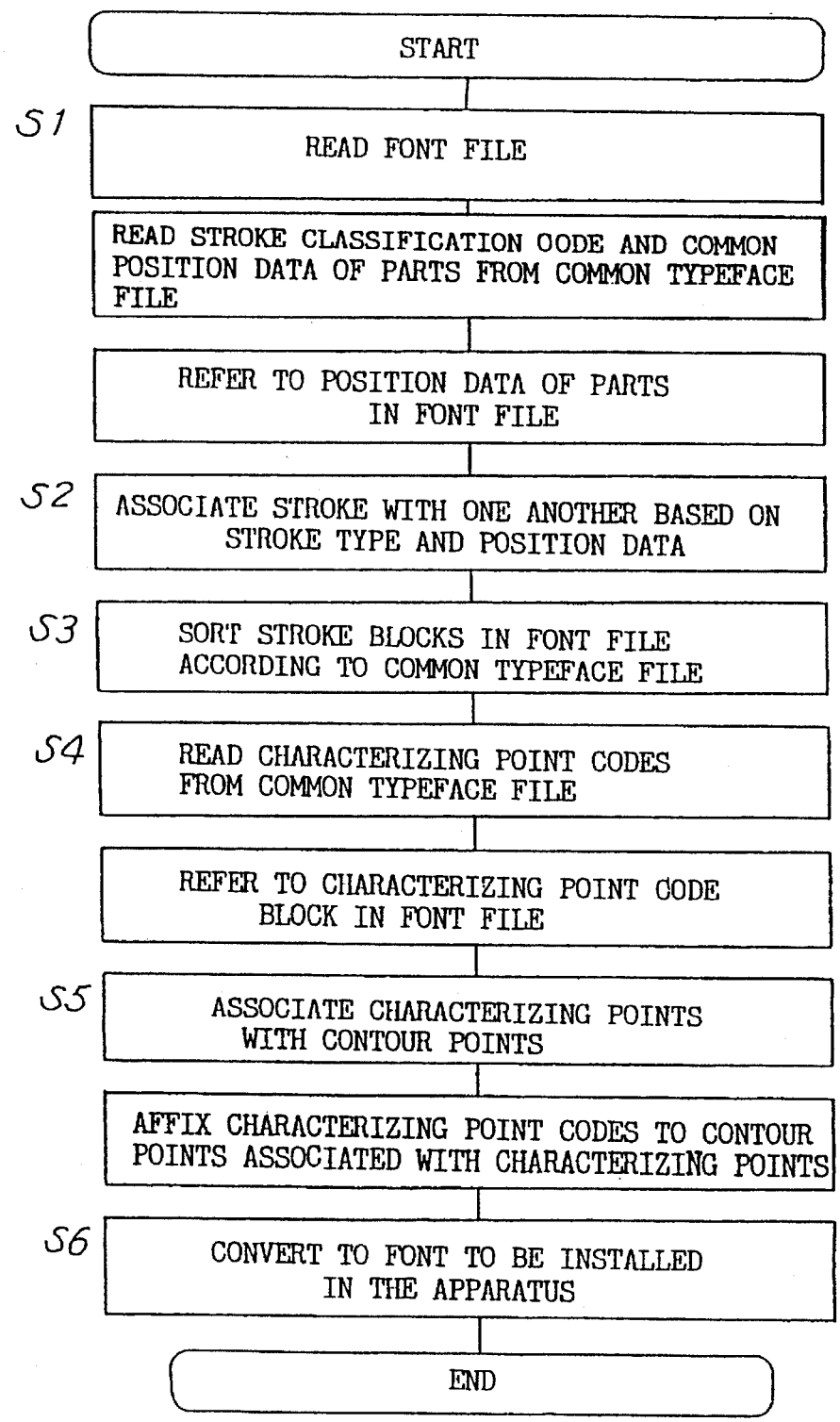
FIG. 18 is a flowchart showing a file preparing process according to the second modification of the present invention.

FIG. 16 is a block diagram showing another modification of the present invention, FIGS. 17A, 17B and 17C are diagrams for explaining a typeface file in FIG. 16, and FIG. 18 is a flowchart showing a file preparing process according to the second modification of the present invention.

This modification is an automatic file preparing tool for preparing a font file having contour data affixed with the contour point codes as shown in FIGS. 11 and 13 from a font file having contour data affixed with no contour point codes.

In FIG. 16, an automatic preparing device 12 prepares the font file 7a having contour data affixed with contour point codes from a font file (outline file) 7-1 having no contour point codes affixed to contour data, by referring to the common typeface file 6. An input section 13 reads data from the font file 7-1. A part pattern associating section 14 refers to the common typeface file 6 to check the stroke order and sorts the strokes according to the stroke order. A characterizing point associating section 15 refers to the common typeface file 6 and affix characterizing point codes to the associated contour points in the font file 7-1. An output section 16 converts the data to a compact format for installation into the apparatus to thereby produce the font file 7a.

Those blocks 13 to 16 represent the functions the CPU in the automatic preparing device 12 executes.

The font file memory 6 is the same as the one shown in FIG. 9, and is provided with the contour point code blocks T6. The font file 7-1 contains data which is not affixed with contour point codes, and the Mincho Kanji character "Ai" in FIG. 17B has a data structure as shown in FIG. 17A, for example. The contour data of the part "drop" shown in FIG. 17C becomes as shown in FIG. 17A. The contents of the file in FIG. 17A differ from those of the aforementioned font file in that the position data of parts are expressed by absolute coordinates, not relative coordinates. In this example, the strokes are not arranged in the stroking order. The font file 7a contains data which is affixed with contour point codes, and has the file contents as shown in FIG. 11 for the Mincho Kanji character "Ai" in FIG. 17B.

The file preparing process will be discussed below with reference to FIG. 18.

(S1) The input section 13 reads the contents of the font file 7-1. The part pattern associating section 14 refers to the common typeface file 6, reads the classification codes of the stroke blocks (T4 in FIG. 9) from the common typeface file 6 and discriminates the types of the individual strokes. Similarly, the part pattern associating section 14 reads the absolute origin positions of the individual parts from the part blocks (T5 in FIG. 9). Further, the part pattern associating section 14 reads the stroke classification codes from the stroke blocks (R2 in FIG. 17) in the font file 7-1, and reads the absolute position data of the individual parts based on the part pointers (R4 in FIG. 17), both via the input section 13.

(S2) The part pattern associating section 14 compares the stroke types and position data in the common typeface file 6 with those in the font file 7-1 to associate the stroke blocks in the common typeface file 6 with those in the font file 7-1.

(S3) The part pattern associating section 14 sorts the stroke blocks R2 in the font file 7-1 in the order of data of the stroke blocks in the common typeface file 6.

(S4) The characterizing point associating section 15 reads the characterizing point code blocks (T6 in FIG. 9) from the common typeface file 6, and reads the contour data blocks R3 from the sorted font file 7-1.

(S5) The characterizing point associating section 15 finds bending points and points having extreme values from the contour data in the contour data blocks R3 in the font file 7-1. With the found contour points as the characterizing points, the characterizing point associating section 15 affixes characterizing point codes of the characterizing point code blocks in the common typeface file 6 to the characterizing points. Since the codes are affixed, the contour points need not be rearranged in this case.

(S6) The output section 16 converts the resultant data to a font file to be installed in the apparatus and writes it as the font file 7a.

In this manner, the font file having the strokes in FIG. 11 rearranged in the stroking order and contour point codes affixed to the contour data of parts is automatically prepared.

Figure 19:
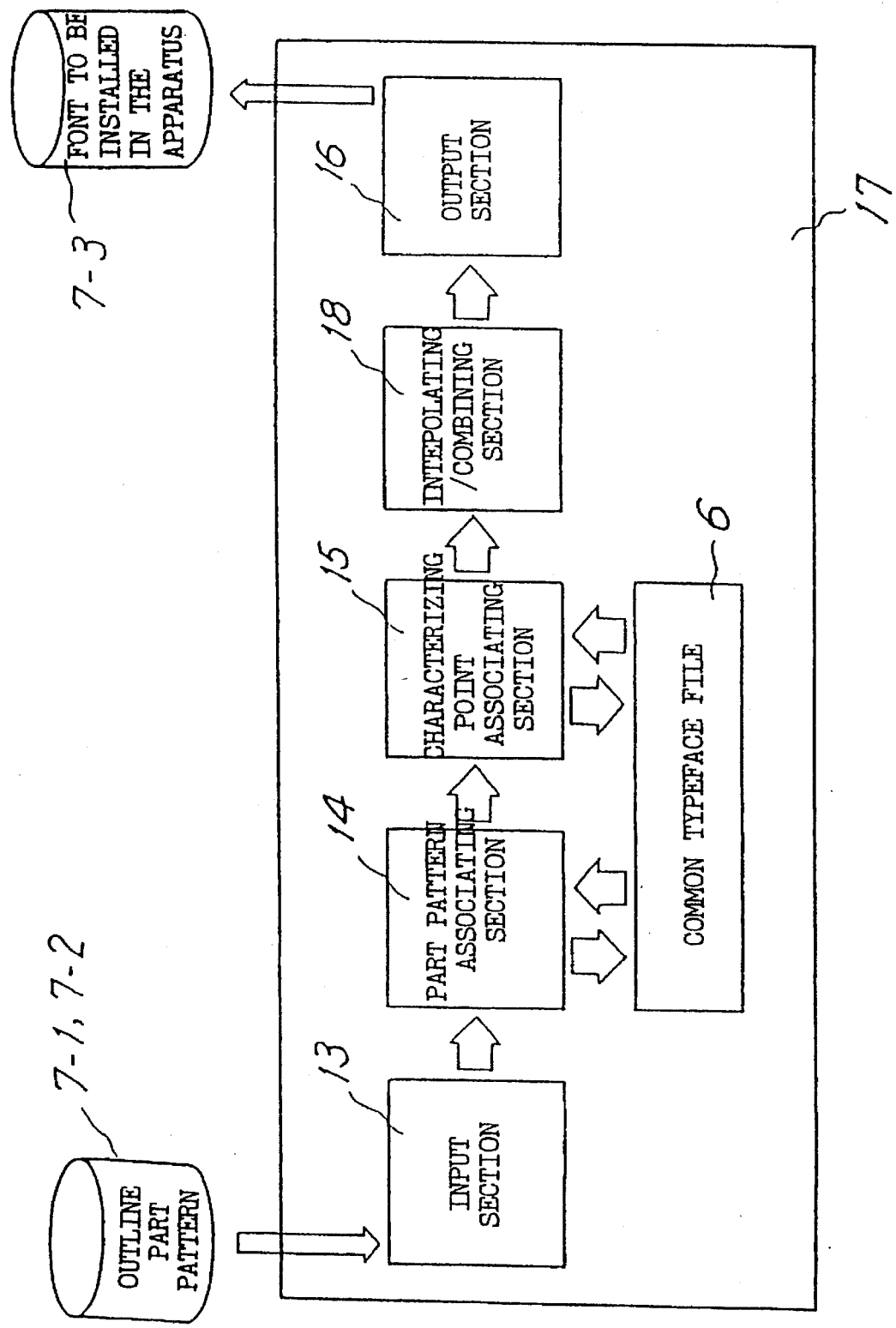
FIG. 19 is a block diagram showing a different modification of the present invention.
Figure 20:
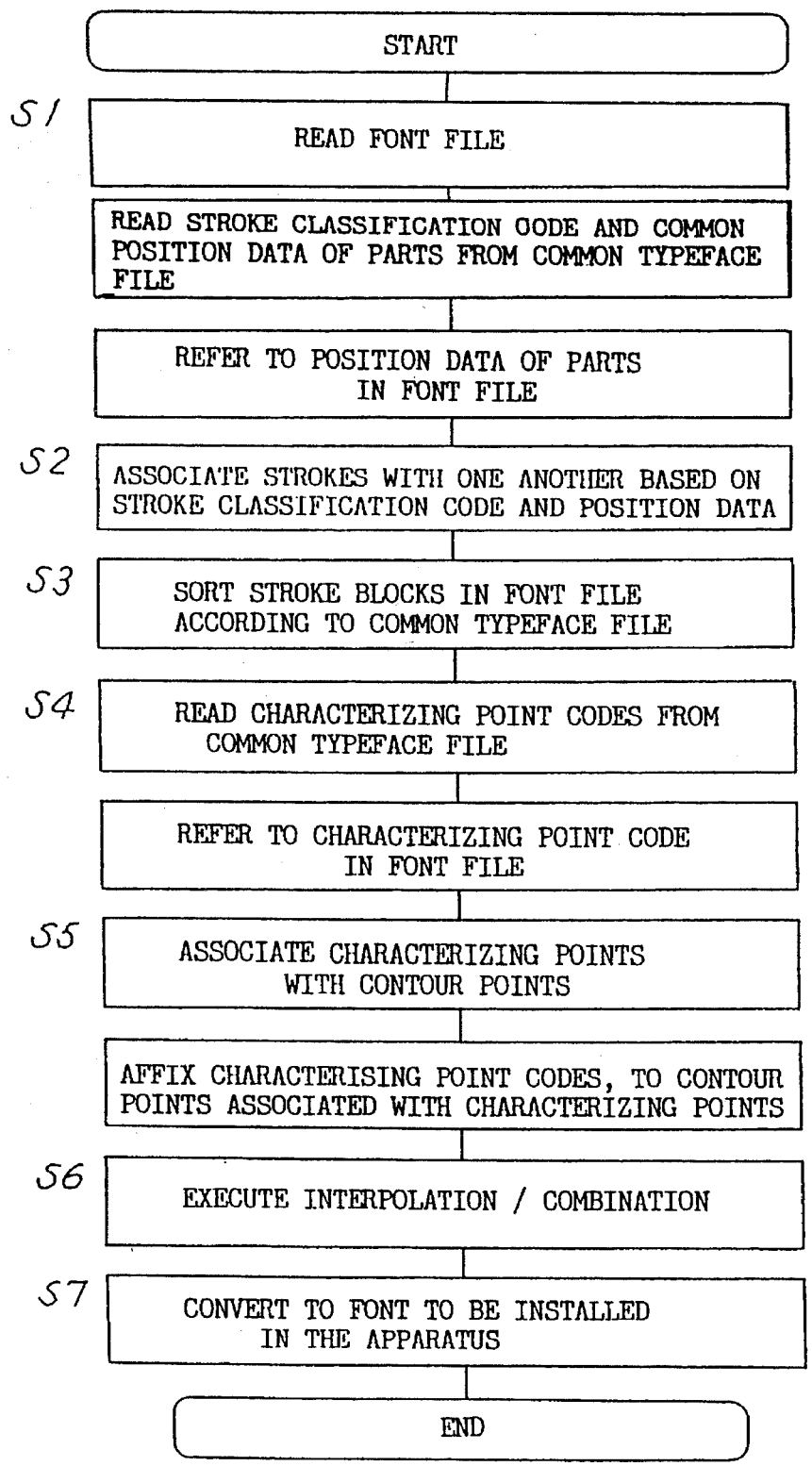
FIG. 20 is a flowchart showing a character combining process according to this modification of the present invention.

FIG. 19 is a block diagram showing a different modification of the present invention, and FIG. 20 is a flowchart showing a character combining process according to this modification of the present invention. This modification is to prepare new typeface file by automatically preparing a file shown in FIG. 16 and performing interporation and combination shown in FIG. 2. FIG. 19 uses the same symbols as used in FIG. 16 to indicate the corresponding or identical components. A combination file preparing device 17 prepares a font file 7-3 for a new combined typeface from two font files 7-1 and 7-2 to which contour point codes are not affixed.

An interpolating/combining section 18 performs an interpolating/combining process from step S3 to step S5 which have been explained with reference to FIG. 15. The font files 7-1 and 7-2 are not affixed with contour point codes, and may be the Mincho font file and Gothic font file shown in FIG. 17. The apparatus-installing font file 7-3 holds characters of a combined typeface.

The character combining process will be discussed below with reference to FIG. 20.

(S1) The input section 13 reads the contents of the font files 7-1 and 7-2. The part pattern associating section 14 refers to the common typeface file 6 to read the classification codes of the stroke blocks (T4 in FIG. 9) from the common typeface file 6 and discriminate the types of the individual strokes. Similarly, the part pattern associating section 14 reads the absolute origin positions of the individual parts from the part blocks (T5 in FIG. 9). Further, the part pattern associating section 14 reads the stroke classification codes from the stroke blocks (R2 in FIG. 17) in the font files 7-1 and 7-2, and reads the absolute position data of the individual parts based on the part pointers (R4 in FIG. 17), both via the input section 13.

(S2) The part pattern associating section 14 compares the stroke types and position data in the common typeface file 6 with those in the font files 7-1 and 7-2 to associate the stroke blocks in the common typeface file 6 with those in the font files 7-1 and 7-2.

(S3) The part pattern associating section 14 sorts the stroke blocks R2 in the font files 7-1 and 7-2 in the order of data of the stroke blocks in the common typeface file 6.

(S4) The characterizing point associating section 15 reads the characterizing point code blocks (T6 in FIG. 9) from the common typeface file 6, and reads the contour data blocks R3 from the sorted font files 7-1 and 7-2.

(S5) The characterizing point associating section 15 finds bending points and points having extreme values from the contour data in the contour data blocks R3 in the font files 7-1 and 7-2. With the found contour points as the characterizing points, the characterizing point associating section 15 affixes characterizing point codes of the characterizing point code blocks in the common typeface file 6 to the characterizing points.

(S6) The interpolating/combining section 18 searches the contour points which have matched contour point codes between the contour points in the font files 7-1 and 7-2 and associates those contour points with one another. The interpolating/combining section 18 computes the coordinates of middle points in the coordinates of the contour points of the corresponding parts to acquire the coordinates of the contour points of the individual parts of each stroke of a character of an interpolated or combined typeface.

(S7) The output section 16 converts the resultant data to a font file to be installed in the apparatus and writes it as the font file 7a.

In this manner, it is possible to automatically prepare a font file for a new typeface obtained through interpolation or combination, from the font files to which no contour point codes are affixed.

Figure 21:
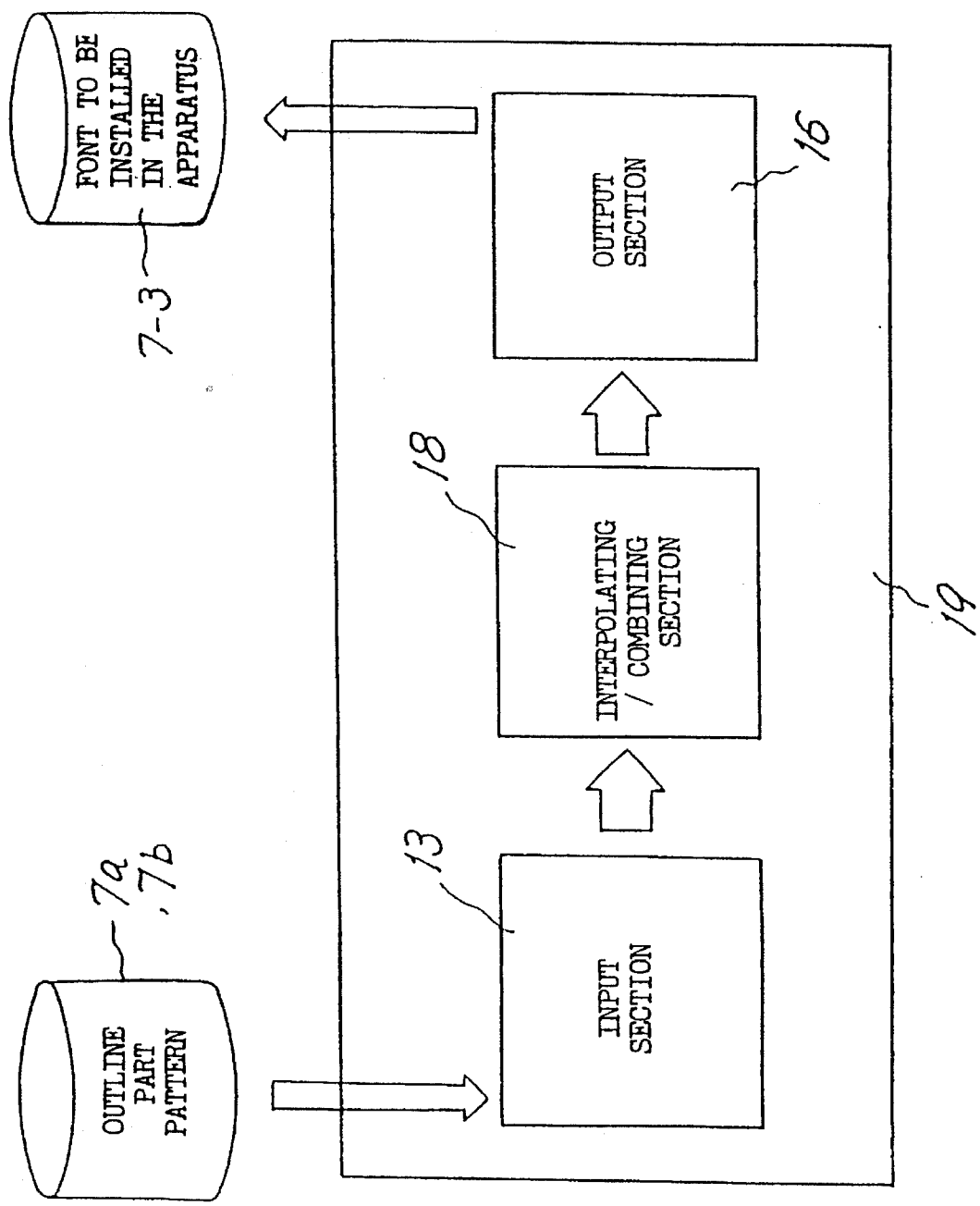
FIG. 21 is a block diagram showing a further modification of the present invention.

FIG. 21 is a block diagram showing a further modification of the present invention.

This embodiment is a modification of the apparatus shown in FIG. 19, and automatically prepares a font file for a new typeface from the font files to which contour point codes are affixed.

FIG. 21 uses the same symbols as used in FIG. 19 to indicate the corresponding or identical components. An interpolating/combining device 19 prepares a font file for a new typeface (file to be installed in the apparatus) from the font files 7a and 7b (see FIGS. 11 and 13) to which contour point codes are affixed.

This embodiment function in such a way that after executing steps S1 to S7 which have been explained above with reference to FIG. 7, the font file (file to be installed in the apparatus) 7-3 for a new typeface is prepared from the font files 7a and 7b (referring to FIGS. 11 and 13) affixed the contour point codes.

Figure 22A:
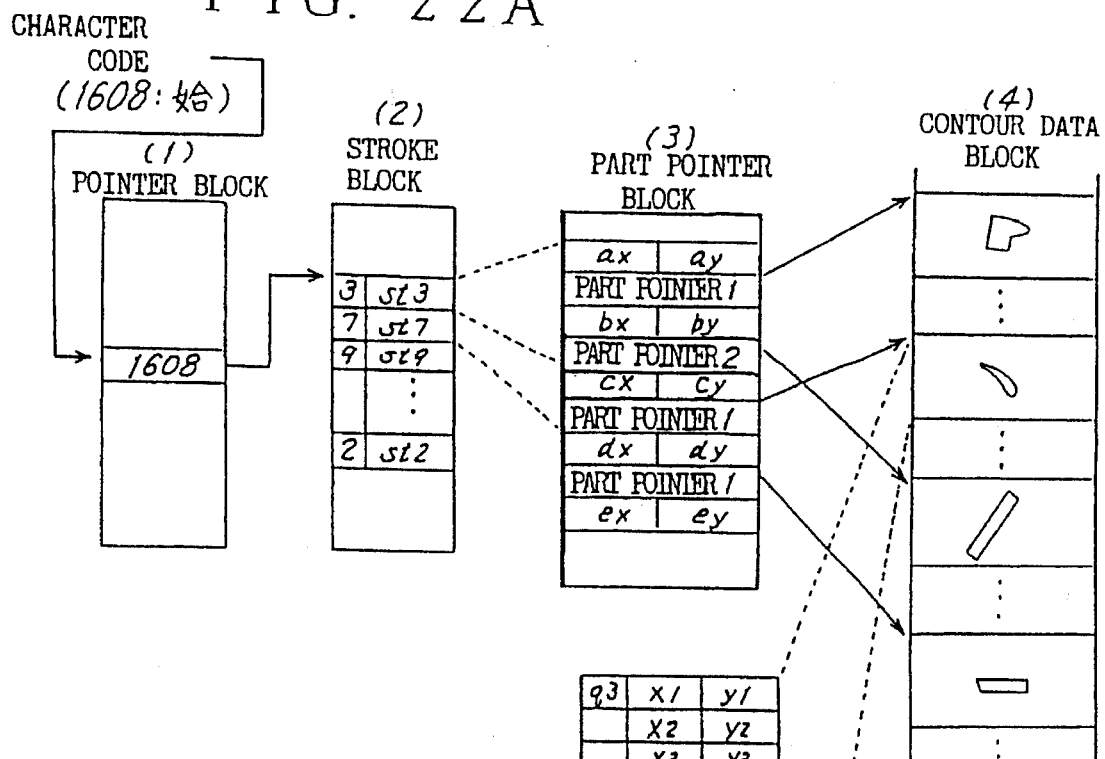
FIGS. 22A and 22B are diagrams for explaining a still further modification of the present invention.
Figure 22B:
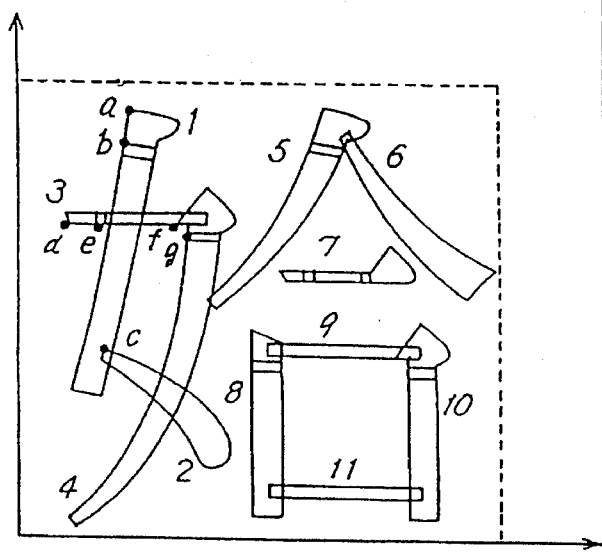
Figure 24:
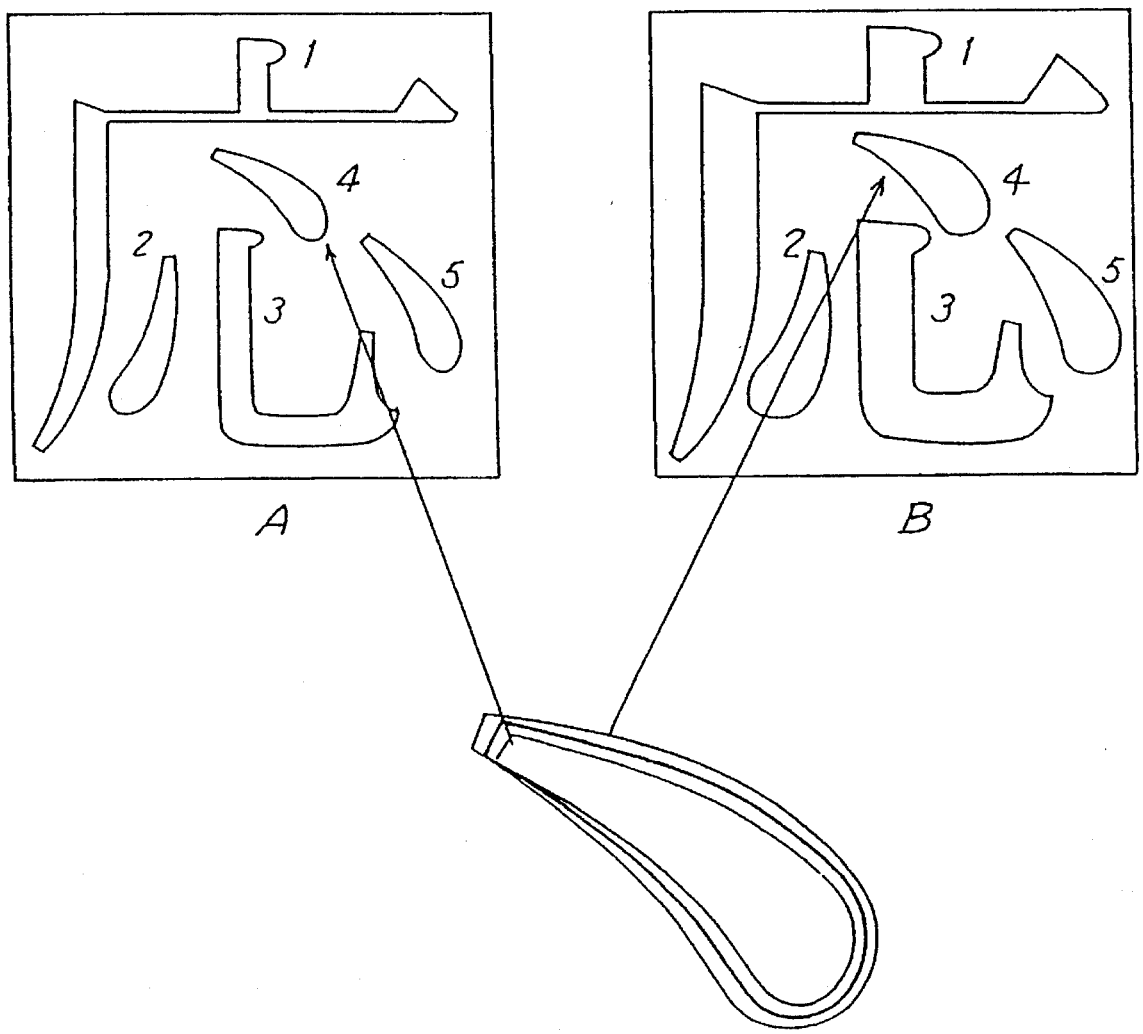
FIG. 24 is an explanatory diagram of a character interpolating operation.

FIGS. 22A and 22B are diagrams for explaining a still further modification of the present invention.

In the font file structure exemplified in FIG. 11, in order to reduce the amount of data as has been explained with reference to FIG. 18, the data in the stroke block is sorted according to the common typeface file 6 to associate the stroke block data based on the sorted order. The font file in this embodiment is affixed with order codes. In FIG. 22A, the order codes are numerals "3," "7," and "9" to "2" affixed to the head of individual pieces of data in the stroke block R2.

The affixing of the order codes by the font preparing tool has the same effect as sorting the data in the stroke block R2 in the font file 7-1 shown in FIG. 17 in the stroking order. Therefore, step S3 in FIG. 18 becomes unnecessary.

The present invention may be modified in various manners other than the above-described embodiments as follows. Although the strokes of a character in one typeface are associated with those in another typeface, codes may be affixed to the elements and/or parts. The codes may be affixed to a combination of the elements, strokes and parts. Although the parts are given contour data, the strokes or elements may have contour data.

In short, specific code data common to individual typefaces is affixed to corresponding part patterns of characters of the individual typefaces or corresponding contour points and part patterns of different typefaces are associated with each other based on the code data to combine characters, so that the association of the corresponding part patterns or corresponding contour points can be achieved without arranging the part patterns or contour points typeface by typeface. Since code data can be affixed to only corresponding part patterns or corresponding contour points, part patterns having no corresponding relationship can be eliminated in the combining process.

What is claimed is:

1. A character combining method for combining a character pattern of a first typeface with a character pattern of a second typeface to generate a character pattern of a third typeface, the method comprising steps of:

providing a first plurality of part patterns for each character pattern of the first typeface;

providing a second plurality of part patterns for each character pattern of the second typeface;

providing a plurality of common typeface structure codes corresponding to respective part patterns of said first and second plurality and affixing a common typeface structure code to each part pattern of said first and second plurality wherein a respective common typeface structure code affixed to a corresponding part pattern is identical for the first and the second typeface;

searching, from said first and second plurality of part patterns, for corresponding part patterns for the character pattern of said first typeface and the character pattern of said second typeface, based on identical common typeface structure codes affixed to said corresponding part patterns; and combining said corresponding part patterns to prepare part patterns of a character pattern of said third typeface.

2. The combining method according to claim 1, wherein said combining step to prepare part patterns of a character pattern of said third typeface includes computing middle points of individual contour points of said corresponding part patterns.

3. The combining method according to claim 1, wherein said searching step for said corresponding part patterns is a step of searching for elements with continuous shapes in said character pattern as said part patterns.

4. The combining method according to claim 1, wherein said step of searching for said corresponding part patterns is a step of searching for strokes obtained by dividing each of elements with continuous shapes in said character pattern as said part patterns.

5. The combining method according to claim 1, wherein said step of searching for said corresponding part patterns is a step of searching for parts obtained by dividing each of strokes, acquired by dividing each of elements with continuous shapes in said character pattern, as said part patterns.

6. A character combining method for combining a character pattern of a first typeface with a character pattern of a second typeface to generate a character pattern of a third typeface, the method comprising the steps of:

providing a first plurality of part patterns having contour points for each character of the first typeface;

providing a second plurality of part patterns having contour points for each character pattern of the second typeface;

providing a plurality of common typeface structure codes corresponding to respective contour points of said part patterns of said first and second plurality and affixing a common typeface structure code to each contour point of said part patterns of said first and second plurality wherein a respective common typeface structure code affixed to a corresponding contour point is identical for the first and the second typeface;

searching, from said first and second plurality of contour points, for corresponding contour points of part patterns for the character pattern of said first typeface and the character pattern of said second typeface based on the identical common typeface structure codes affixed to said corresponding contour points; and combining said corresponding contour points to prepare contour points of a character pattern of said third typeface.

7. The combining method according to claim 6, wherein said combining step to prepare contour points of part patterns of a character pattern of said third typeface includes computing middle points of individual contour points of corresponding part patterns.

8. The combining method according to claim 6, further comprising the step of obtaining characterizing point codes and affixing said characterizing point codes to individual contour points of part patterns of character patterns of said first and second typefaces.

9. The combining method according to claim 6, wherein said step of searching for said corresponding contour points is the step of searching for contour points of each of elements with continuous shapes in said character pattern as said contour points.

10. The combining method according to claim 6, wherein said step of searching for said corresponding contour points is the step of searching for contour points of each of strokes obtained by dividing each of elements with continuous shapes in said character pattern as said contour points.

11. The combining method according to claim 6, wherein said step of searching for said corresponding contour points is the step of searching for contour points of each of parts obtained by dividing each of strokes, acquired by dividing each of elements with continuous shapes in said character pattern, as said contour points.

12. The combining method according to claim 7, wherein said step of searching for said corresponding contour points is the step of searching for contour points of each of elements with continuous shapes in said character pattern as said contour points.

13. The combining method according to claim 7, wherein said step of searching for said corresponding contour points is the step of searching for contour points of each of strokes obtained by dividing each of elements with continuous shapes in said character pattern as said contour points.

14. The combining method according to claim 7, wherein said step of searching for said corresponding contour points is the step of searching for contour points for each of parts obtained by dividing each of strokes, acquired by dividing each of elements with continuous shapes in said character pattern, as said contour points.

15. A character combining apparatus for combining a character pattern of a first typeface with a character pattern of a second typeface to generate a character pattern of a third typeface, the apparatus comprising:

typeface data memory having a first typeface file for storing individual part patterns of each character pattern of said first typeface wherein each part pattern is affixed with a respective common typeface structure code also stored in said first typeface file, and a second typeface file for storing individual part patterns of each character pattern of said second typeface wherein each part pattern is affixed with a respective common typeface code also stored in said second typeface file and wherein each respective common typeface structure code affixed to a corresponding part pattern is identical for the first and the second typeface; and a character processing circuit for reading part patterns of a character pattern from said first typeface memory and part patterns of a character pattern from said second typeface memory and combining corresponding part patterns affixed with the identical common typeface codes to prepare part patterns of a character pattern of said third typeface.

16. The combining apparatus according to claim 15, wherein said character processing circuit computes middle points of individual contour points of said corresponding part patterns to combine said part patterns.

17. The combining apparatus according to claim 15, wherein said typeface data memory stores elements with continuous shapes in said character pattern as said part patterns.

18. The combining apparatus according to claim 15, wherein said typeface data memory stores strokes obtained by dividing each of elements with continuous shapes in said character pattern as said part patterns.

19. The combining apparatus according to claim 15, wherein said typeface data memory stores parts obtained by dividing each of strokes, acquired by dividing each of elements with continuous shapes in said character pattern, as said part patterns.

20. A character combining apparatus for combining a character pattern of a first typeface with a character pattern of a second typeface to generate a character pattern of a third typeface, the apparatus comprising:

typeface data memory having a first typeface file for storing coordinates of individual contour points of each of part patterns of each character pattern of said first typeface wherein each individual contour point is affixed with a respective common typeface code also stored in said first typeface file, and a second typeface file for storing coordinates of individual contour points of each of part patterns of each character pattern of said second typeface wherein each individual contour point is affixed with a respective common typeface code also stored in said second typeface file and wherein each respective common typeface structure code affixed to a corresponding contour point is identical for the first and the second typeface; and a character processing circuit for reading contour points of each of part patterns of a character pattern from said first typeface memory and contour points of each of part patterns of a character pattern from said second typeface memory and combining corresponding contour points affixed with the identical common typeface codes to prepare contour points of each of part patterns of a character pattern of said third typeface.

21. The combining apparatus according to claim 20, wherein said character processing circuit computes middle points of said corresponding contour points to combine said contour points of said part patterns.

22. The combining apparatus according to claim 20, wherein to affix common typeface structure codes to individual contour points of part patterns of character patterns of said first and second typefaces, said character processing circuit obtains characterizing points of said part patterns and affixes said common typeface structure codes to said characterizing points.

23. The combining apparatus according to claim 20, wherein said typeface data memory stores elements with continuous shapes in said character pattern as said part patterns.

24. The combining apparatus according to claim 20, wherein said typeface data memory stores strokes obtained by dividing each of elements with continuous shapes in said character pattern as said part patterns.

25. The combining apparatus according to claim 20, wherein said typeface data memory stores parts obtained by dividing each of strokes, acquired by dividing each of elements with continuous shapes in said character pattern, as said part patterns.

26. The combining apparatus according to claim 21, wherein said typeface data memory stores elements with continuous shapes in said character pattern as said part patterns.

27. The combining apparatus according to claim 21, wherein said typeface data memory stores strokes obtained by dividing each of elements with continuous shapes in said character pattern as said part patterns.

28. The combining apparatus according to claim 21, wherein said typeface data memory stores parts obtained by dividing each of strokes, acquired by dividing each of elements with continuous shapes in said character pattern, as said part patterns.

* * * * *